United States Patent
Nagata et al.

(10) Patent No.: US 12,346,248 B2
(45) Date of Patent: Jul. 1, 2025

(54) PRIVATE MEMORY MODE SEQUENTIAL MEMORY ACCESS IN MULTI-THREADED COMPUTING

(71) Applicant: AzurEngine Technologies Zhuhai Inc., Zhuhai (CN)

(72) Inventors: Toshio Nagata, Lake Elsinore, CA (US); Yuan Li, San Diego, CA (US); Jianbin Zhu, San Diego, CA (US)

(73) Assignee: AzurEngine Technologies Zhuhai Inc., Zhuhai (CN)

( * ) Notice: Subject to any disclaimer, the term of this patent is extended or adjusted under 35 U.S.C. 154(b) by 217 days.

(21) Appl. No.: 18/231,820

(22) Filed: Aug. 9, 2023

(65) Prior Publication Data

US 2025/0053505 A1 Feb. 13, 2025

(51) Int. Cl.
*G06F 9/50* (2006.01)
*G06F 12/02* (2006.01)

(52) U.S. Cl.
CPC ........ *G06F 12/0223* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 12,093,214 B2 * | 9/2024 | Braidwood | G06F 15/8053 |
| 12,131,157 B2 * | 10/2024 | Nagata | G06F 9/3001 |
| 2025/0021376 A1 * | 1/2025 | Nagata | G06F 15/8092 |

OTHER PUBLICATIONS

"Arm A64 instruction Set Architecture, for Arm A-class—Future Architecture Technologies in the A architecture profile". ARM Limited. Copyrighted 2018-2020. Available: https://developer.arm.com/documentation/ddi0602/2020-12/ (Year: 2020).*

* cited by examiner

*Primary Examiner* — Michael Sun
(74) *Attorney, Agent, or Firm* — IPro, PLLC

(57) ABSTRACT

Processors, systems and methods are provided for thread level parallel processing where threads in a warp are concurrently executed. A method may include sending thread block dimension information and addressing parameters stored in scalar registers of a sequencer by the sequencer to a memory port, generating a scalar memory address by the memory port and based on the thread block dimension information and the addressing parameters, and loading K words of data for a warp to a vector register from K consecutive memory addresses starting at the scalar memory address by a memory interface and a memory unit. The scalar memory address may point to a storage location of a piece of data for a first thread of the warp. And K may be a warp size representing a number of threads to be concurrently processed by executing a vector instruction.

20 Claims, 11 Drawing Sheets

PRIVATE MEMORY MODE SEQUENTIAL MEMORY ACCESS IN MULTI-THREADED COMPUTING

TECHNICAL FIELD

The disclosure herein relates to computer architecture, particularly relates to a multi-threaded computer architecture that uses a scalar memory address to load and store vector data for multiple threads in a Single Instruction Multiple Threads (SIMT) computing system.

BACKGROUND

Graphics processing unit (GPU) architecture has provided a way to execute parallel threads in a Single Instruction Multiple Threads (SIMT) fashion. A SIMT processor such as a GPU has many cores configured to execute multiple threads simultaneously and is especially suitable for massive parallel computing applications. To take advantage of multiple cores for parallel execution, computer programs normally have to be tailored for the multi-core architecture by invoking functions of an Application Programming Interface (API) specifically designed to work on multiple cores. More recently, general-purpose computing on GPUs (GPGPU), which makes use of a GPU to perform computation in applications traditionally handled by the central processing unit (CPU), becomes more practical and popular. However, loading and storing data for multiple concurrent threads requires data addresses for each thread. These data addresses generally need to be prepared by vector operations beforehand and have to use a vector address bus. Therefore, there is a need in the art for a processor to load and store data for multiple threads more efficiently.

SUMMARY

The present disclosure describes apparatus, methods and systems for efficiently loading vector data using a scalar memory address. In an exemplary embodiment, a method may comprise: sending thread block dimension information and addressing parameters stored in scalar registers of a sequencer by the sequencer to a memory port, generating a scalar memory address by the memory port and based on the thread block dimension information and the addressing parameters, and loading K words of data for a warp to a vector register from K consecutive memory addresses starting at the scalar memory address by a memory interface and a memory unit. The scalar memory address may point to a storage location of a piece of data for a first thread of the warp. K may be a warp size representing a number of threads to be concurrently processed by executing a vector instruction. The piece of data may have a size less than or equal to a word size.

In another exemplary embodiment, a processor may comprise: a sequencer, a memory port coupled to the sequencer, and a memory unit coupled to the memory port via a memory interface. The sequencer may be configured to send thread block dimension information and addressing parameters stored in scalar registers of the sequencer to the memory port, and the memory port may be configured to generate, based on the thread block dimension information and the addressing parameters, a scalar memory address pointing to a storage location of a piece of data for a first thread of a warp. The memory unit and the memory interface may be configured to load K words of data for the warp to a vector register from K consecutive memory addresses starting at the scalar memory address for a data loading process or store K words of data for the warp from the vector register to the K consecutive memory addresses starting at the scalar memory address for a data storing process. K may be a warp size representing a number of threads to be concurrently processed by executing a vector instruction. The piece of data may have a size less than or equal to a word size.

In yet another embodiment, a method may comprise sending, by a sequencer to a memory port, thread block dimension information and addressing parameters stored in scalar registers of the sequencer; generating, by the memory port and based on the thread block dimension information and the addressing parameters, a scalar memory address; and storing, by a memory interface and a memory unit, K words of data for a warp from a vector register to K consecutive memory addresses starting at the scalar memory address. The scalar memory address may point to a storage location of a piece of data for a first thread of the warp and K may be a warp size representing a number of threads to be concurrently processed by executing a vector instruction. The piece of data may have a size less than or equal to a word size.

DETAILED DESCRIPTION

Figure 1:
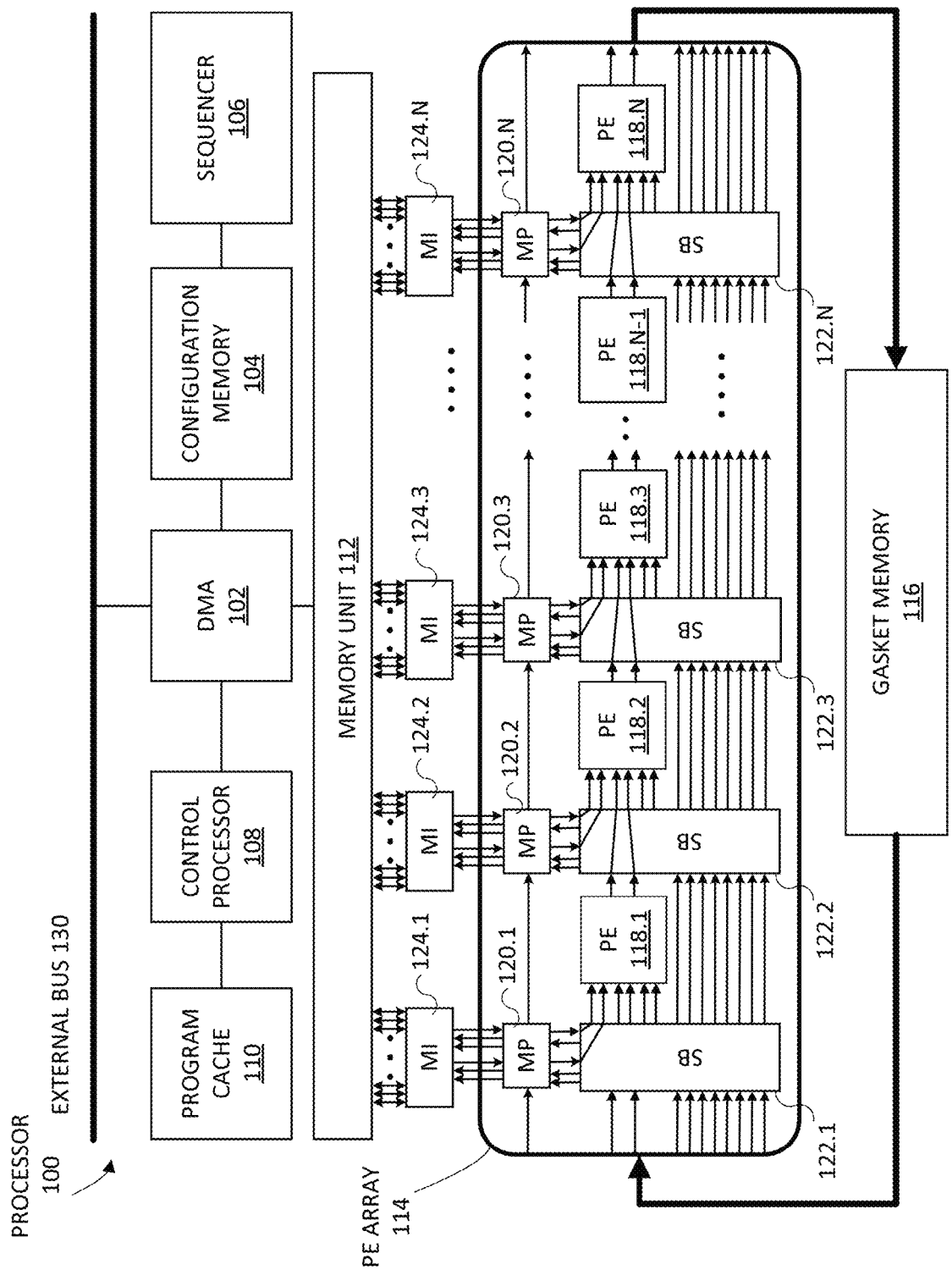
FIG. 1 schematically shows a processor in accordance with an embodiment of the present disclosure.

Reference will now be made in detail to the embodiments of the present teaching, examples of which are illustrated in the accompanying drawings. Like elements in the various figures are denoted by like reference numerals for consistency. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

FIG. 1 schematically shows a processor 100 according to an embodiment of the present disclosure. The processor 100 may comprise a direct memory access (DMA) module 102, a configuration memory 104, a sequencer 106, a control processor 108, a program cache 110, a memory unit 112, a plurality of memory interfaces 124.1-124.N, a PE array 114 and a gasket memory 116. The DMA module 102 may be coupled to an external bus 130 and may be controlled by the control processor 108. The DMA module 102 may be responsible to move executable instructions and non-executable data in and out from the external bus 130. The program cache 110 may store instructions and data to be used by the control processor 108 to control the operation of the DMA module 102. In one embodiment, the instructions and data stored in the program cache 110 may be used by the control processor 108 to handle sequencer programs.

In some embodiments, the processor 100 may be configured for massive thread level parallel processing. For example, one processing element (PE) in the PE array 114 may comprise a vector Arithmetic Logic Unit (ALU) with a vector size more than one and each ALU of a vector ALU may be configured to perform same operation but on different data (e.g., each thread may operate on its own data). That is, in these embodiments with multiple ALUs, each PE may be configured to operate in a Single Instruction Multiple Threads (SIMT) fashion. In one embodiment, a PE with multiple vector data inputs may generate one vector data output. In some embodiments, a thread may also be referred to as a stream.

To provide data for multiple threads to be executed concurrently, in some embodiments, some relevant electronic connections between components of the processor 100 may be in vectors. For example, a vector address connection of K×G bits may have K number of G-bit addresses and a vector data connection of K×M bits may have K number of M-bit words of data. It should also be noted that although not shown in any of the figures, data or address connections between different components may be accompanied by one or more signal lines. For example, a busy signal line may exist between a first component and a second component, and may be used by the first component to send a busy signal to the second component indicating that the first component is not ready to accept valid data or address signals. Moreover, a valid signal line may also exist between the first and second components, and may be used by the second component to send a valid signal to the first component indicating that valid data or address signals have been put on the connection wires.

The configuration memory 104 may store data path programs including arithmetic and logical instructions, and load and store instructions for data path components. In one embodiment, the data path programs stored in the configuration memory 104 may be sequence(s) of compiled instructions. For example, a data path program may include instructions to be executed by the PE array 114, which may specify what kind of operations PEs may perform, and how data path components may hold or transmit data.

The sequencer 106 may decode the instructions stored in the configuration memory 104. The instructions may include scalar instructions and vector instructions. For a scalar instruction, the sequencer 106 may decode the scalar instruction and perform the scalar operation coded by the scalar instruction. For a vector instruction, the sequencer 106 may decode the vector instruction and deliver the decoded vector instruction to various components of the PE array 114 (e.g., components of the PE array 114 that will be involved in arithmetic and logical operations, and data movement operations), such that the vector operations coded by the vector instruction may be performed by the components of the PE array 114. These components of the PE array 114 may also be referred to as vector processing units. As used herein, a scalar operation may refer to execution of a scalar instruction and a vector operation may refer to execution of a vector instruction.

The decoded vector instruction may be delivered to various components in a package, which may be referred to as a configuration package or simply a configuration. In addition to the decoded instruction, a configuration package for one component may include some other parameters (e.g., the number of warps specifying how many times an instruction is to be repeatedly executed and how many times data passes through a data switching unit in one configuration setting, and immediate values passed from the sequencer to the component). As used herein, a warp may refer to a number of threads concurrently executed in one PE, for example, for a PE with 32 ALUs, a warp may refer to 32 threads executed in parallel by a PE. In one embodiment, a physical data path configuration may be referred to as a physical data path program, which may comprise individual configurations for various components included in a physical data path.

Although not shown, there may be a configuration bus connecting the sequencer 106 to the components of the PE array 114 for individual configurations to be delivered to these components via the bus. For example, there may be a configuration bus for delivering the configurations for the memory ports, switch boxes and PEs. In some embodiments, the configuration for the memory ports may include data preparation instructions, such as but not limited to, LOAD/STORE instructions (and parameters, such as addresses, for the instructions), and the configuration for the PEs may include instructions to be executed by the ALUs in the PEs, such as but not limited to, data crunching instructions like addition or subtraction.

The memory unit 112 may be a data staging area to store data received from the external bus 130 and also execution result data generated by the PE array 114 (before these results may be transmitted away via the external bus 130). In some embodiments, the memory unit 112 may be an in-processor cache for a large memory system external of the processor 100.

The PE array 114 may comprise a plurality of memory ports (MPs) 120.1-120.N, a plurality of switch boxes (SBs) 122.1-122.N, and a plurality of processing elements (PEs) 118.1-118.N. These components may form N columns of programmable hardware units or programmable hardware components. For example, the MP 120.1, SB 122.1, and PE 118.1 may form the first column of the PE array 114, and the MP 120.N, SB 122.N, and PE 118.N may form the Nth column of the PE array 114. Each column of programmable hardware units may also be referred to as a column of vector processing units or simply a column in an embodiment in which each of these hardware units is configured for vector processing. In the example shown in FIG. 1, the PE array 114 may comprise one row of processing elements 118.1-118.N, which may include N PEs with N being an integer number. In the embodiments described herein, the number N may be 32. But this is an example and it may be another integer number in other embodiments, such as, but not limited to, 16, 64, etc. Although these example numbers given may be power of 2, the number of PEs in one row need not be a power of 2 in one embodiment.

The plurality of MPs 120.1-120.N may be programmable hardware units controlling data flow between the PE array 114 and the memory unit 112. As shown in FIG. 1, the plurality of MPs 120.1-120.N may be coupled to the memory unit 112 via the plurality of memory interfaces (MIs) 124.1-124.N. Each MP 120.1-120.N may be coupled to the memory unit 112 via a respective MI 124.1-124.N to read from and write to the memory unit 112. Thus, the MI 124.1 may be the gateway to the memory unit 112 for the first column of PE array 114, and so on until the MI 124.N may be the gateway to the memory unit 112 for the N-th column of PE array 114. Each MP 120.1-120.N may also be coupled to a SB in a respective column to transmit data to and from each column. For example, MP 120.1 may be coupled to SB 122.1, MP 120.2 may be coupled to SB 122.2, and so on. In some embodiments, the memory unit 112 and the MIs 124.1-124.N may be collectively referred to as a multi-port memory unit. Moreover, in at least one embodiment, the memory unit 112, the MIs 124.1-124.N and MPs 120.1-120.N may support two memory accessing modes: a private memory access mode and a shared memory access mode, which may also be referred to as private memory access method (or simply private memory access) and shared memory access method (or simply shared memory access). It should be noted that while MIs 124.1-124.N are shown as separate entities in FIG. 1, in some embodiments, they may be implemented as part of respective MPs 120.1-120.N, or in some other embodiments, as part of the memory unit 112.

With the exception of MP 120.1 and MP 120.N, all MPs may be coupled to two adjacent MPs such that each MP may be configured to receive addresses from a preceding MP and/or transmit addresses to a succeeding MP. The electronic coupling between MPs may provide a one-way flow of addresses (e.g., if one configuration specifies that addresses may flow from one MP to a next MP). For example, as shown in FIG. 1, MP 120.1 may be coupled to MP 120.2 for one-way flow of addresses, MP 120.2 may be coupled to MP 120.3 for one-way flow of addresses. The last MP 120.N may be an exception and coupled to the gasket memory 116, which may provide a temporary storage for addresses. The first MP 120.1 may be another exception in that it may receive one-way flow of addresses from the gasket memory 116. In some embodiments, the MPs 120.1-120.N may form an address routing bus along a PE row direction. That is, addresses may be routed between MPs in a direction that is parallel to the direction in which data may be routed between PEs and SBs. In at least one embodiment, the addresses transmitted between the MPs may be memory addresses updated by a MP. For example, a MP may perform some operation on the memory addresses (e.g., updating memory addresses) and pass the updated memory addresses to the next MP in the succeeding column.

The gasket memory 116 may be used as a data buffer, for example, first-in-first-out (FIFO), to collect addresses and data from the PE array (e.g., from MP 120.N, PE 118.N and/or SB 122.N) and feed them back to the PE array (e.g., to MP 120.1, and/or SB 122.1) when the first column of the PE array (e.g., MP 120.1, SB 122.1, and PE 118.1) is reconfigured by new configurations.

In some embodiments, the PEs, SBs, and MPs may be statically configured while processing a thread block. For example, each of PEs, SBs, and MPs may be programmed with instructions specified in respective configurations to perform one stage of a pipeline. No instructions may be changed while data in the thread block are passing through the pipeline stage. The address computation instructions and memory access instructions such as LOAD and STORE may be mapped to MPs (e.g., packaged in configurations sent to respective MPs), the data switching instructions may be mapped to SBs (e.g., packaged in configurations sent to respective SBs), and other instructions may be mapped to PEs (e.g., packaged in configurations sent to respective PEs).

As illustrated in FIG. 1, each of the SB 122.1-122.N may be coupled to two adjacent SB (e.g., a preceding SB and a succeeding SB), with the exception of SB 122.1 and SB 122.N. SB 122.1 may be coupled to the MP 120.1, the gasket memory 116, PE 118.1 and the SB 122.2. And SB 122.N may be coupled to the MP 120.N, the gasket memory 116, PE 118.N and the SB 122.N-1. In some embodiments, the SBs 122.1-122.N may form data routing buses along a PE row direction. That is, data may be routed between SBs in a direction that is parallel to the direction in which data may be routed between PEs. In one embodiment, one or more SBs may be used to route data to bypass one or more PEs.

The SBs 122.1-122.N may be configured to provide data switching for data to be routed between neighboring PEs, from a PE to a MP, from a PE to the data routing buses, from a MP to a PE, from a MP to the data routing buses, from the data routing buses to a PE, and from the data routing buses to a MP. For example, the switch box 122.1 may be configured to provide data switching for data to be delivered to the processing element 118.1 from the gasket memory 116, the MP 120.1 or both. Moreover, the switch box 122.1 may be configured to route data from the gasket memory 116 to the MP 120.1. As another example, the switch box 122.2 may be configured to provide data switching for data to be delivered to the processing element 118.2 from the processing element 118.1, the MP 120.2, and/or the SB 122.1. Moreover, the switch box 122.2 may be configured to route data from the processing element 118.1 to the MP 120.2 or SB 122.3, from the SB 122.1 to the MP 120.2 or SB 122.3. In yet another example, the switch box 122.N may be configured to provide data switching for data to be delivered to the processing element 118.N from the PE 118.N-1, the MP 120.N, the SB 122.N-1 or any combination of the three sources. Moreover, the switch box 122.N may be configured to route data between PE 118.N-1, MP 120.N, SB 122.N-1 and the gasket memory 116. A SB may also be referred to as a data switching unit.

In some embodiments, output ports of vector processing units (e.g., each MP, each SB, and each PE) may be vector address or vector data ports. Address or data buffers at the output ports may be treated as vector registers. For example, a data buffer at one output port of the PE 118.1 coupled to the SB 122.2 may be treated as a vector register for holding a vector of input values to the SB 122.2. A data buffer at another output port of the PE 118.1 coupled to the SB 122.2 may be treated as another vector register to hold another vector of input values to the SB 122.2. Also, data buffers at output ports of the SB 122.1 coupled to the SB 122.2 may be treated as vector registers for holding vectors of data values to be passed to the SB 122.2.

In one embodiment, data or address buffers at output ports of vector processing units may be mapped to vector registers labeled as VA, VB, IA, IB, IC, ID, IE, IF, IG, IH and DVA. VA and VB may be vector registers for output data buffers of a PE. IA, IB, IC, ID, IE, IF, IG, and IH may be vector registers for output data buffers of a SB at output ports coupled to input ports of the succeeding SB or the gasket memory. DVA may be a vector register for an output address buffer of a MP. Also, virtual vector registers MA and MB may be mapped to data connections from a MP to a SB so that the SB may route data read from the memory unit 112 to input ports of a PE. MA and MB may represent data obtained by the shared memory access and by the private memory access, respectively. The width of DVA may be K×G bits. The widths of other vector registers may be K×M bits. The width of ALUs in a PE may be configured to be either M bits (one word) or 2×M bits (two words). To support 2×M-bit operations, 2 vector registers may be concatenated into a register pair and labeled as VAB, IAB, ICD, IEF, IGH, and MAB. For example, IAB may indicate a concatenated vector register pair (IB, IA) with IB being the higher M bits and IA being the lower M bits. Here (,) denotes component by component concatenation of M-bit data from 2 vector registers.

An exemplary data path may be illustrated by the exemplary internal connections of the SBs 122.1 to 122.N. For example, as shown in FIG. 1, SB 122.1 may show that two inputs of PE 118.1 may be coupled to two outputs from MP 120.1, SB 122.2 may show that two inputs of PE 118.2 may be coupled to two outputs from MP 120.2 and another two inputs of PE 118.2 may be coupled to two outputs from PE 118.1, SB 122.3 may show that two inputs of PE 118.3 may be coupled to two outputs from MP 120.3 and another two inputs of PE 118.3 may be coupled to two outputs from PE 118.2, and so forth, until SB 122.N may show that two inputs of PE 118.N may be coupled to two outputs from MP 120.N and another two inputs of PE 118.N may be coupled to two outputs from PE 118.N-1.

To simplify wording, a MP (or a MP 120) may refer to one of the MPs 120.1-120.N, a SB (or a SB 122) may refer to one of the SBs 122.1-122.N, and a PE (or a PE 118) may refer to one of the PEs 118.1-118.N.

A mixed-scalar-vector instruction set may be defined for the processor 100. The MPs 120.1-120.N, SBs 122.1-122.N, and PEs 118.1-118.N may be vector processing units of the processor 100 and the sequencer 106 may be a scalar processing unit of the processor 100. The instruction set may be designed such that one instruction may be executed by one programmable unit. For example, in one embodiment, each instruction may have 32 bits and certain bits of each instruction (e.g., the most significant 4 bits, the least significant four bits, or other bits) may identify the unit (e.g., the sequencer 106 or one component of the PE array 114) that executes the instruction.

Kernel programs may be made up of series of group of instructions. Scalar instructions may generate parameters used in vector instructions and manage loops and branches. Vector instructions may configure data paths in columns, control data flow and perform data crunching operations. One group of instructions may configure one column. An instruction for a PE including a no-operation (NOP) may be a delimiter of the group. In some embodiments, instructions in one group may be organized such that scalar instructions that generate parameters for vector instructions are placed before vector instructions. Columns do not directly decode vector instructions. Instead, the sequencer 106 may decode scalar and vector instructions, execute decoded scalar instructions and package decoded vector instructions in configurations and send configurations of memory ports (MPs 120.1-120.N), switch boxes (SBs 122.1-122.N), and processing elements (PEs 118.1-118.N) to columns.

In various embodiments, the processor 100 may be configured to perform Single Instruction Multiple Threads (SIMT) execution. A group of threads may form a block (e.g., a thread block) and a group of blocks may be organized into a grid. The organization of grid and block may be defined for a kernel program before the execution of the kernel program. Each block and thread may have a unique block and thread identifier (e.g., block ID and thread ID), respectively. The block ID for a block in a three-dimensional grid may be calculated as blockId=blockIdx.x+ (blockIdx.y*gridDim.x)+ (blockIdx.z*(gridDim.x*gridDim.y)). Variables blockIdx.x, blockIdx.y, and blockIdx.z may be the block ID in the x axis, y axis, and z axis of the block, respectively. Variables gridDim.x and gridDim.y may be grid dimensions in the x axis and y axis, respectively. The "*" operator is the multiplication operator. The thread ID for a thread in a three-dimensional block may be calculated as threadId=blockId*(blockDim.x blockDim.y*blockDim.z)+ threadIdx.x+ (threadIdx.y*blockDim.x)+ (threadIdx.z* (blockDim.x*blockDim.y)). Variables threadIdx.x, threadIdx.y, and threadIdx.z may be the thread ID in the x axis, y axis, and z axis of the thread, respectively. Variables blockDim.x, blockDim.y, and blockDim.z may be block dimensions in the x axis, y axis, and z axis, respectively.

As used herein, the capital letters X, Y, and Z may refer to dimensions of a thread block in the x axis, y axis, and z axis of the block, respectively. In one embodiment, the values for X, Y, and XYZ (e.g., the multiplication product of X times Y times Z) may be set by the system in the local memory 812 of the sequencer 106 before launching a kernel. And the sequencer 106 may load X, Y, and XYZ from the local memory 812, store them in scalar registers of the sequencer 106 and deliver them as immediate values in configurations to columns (e.g., MPs in a column).

Figure 2:
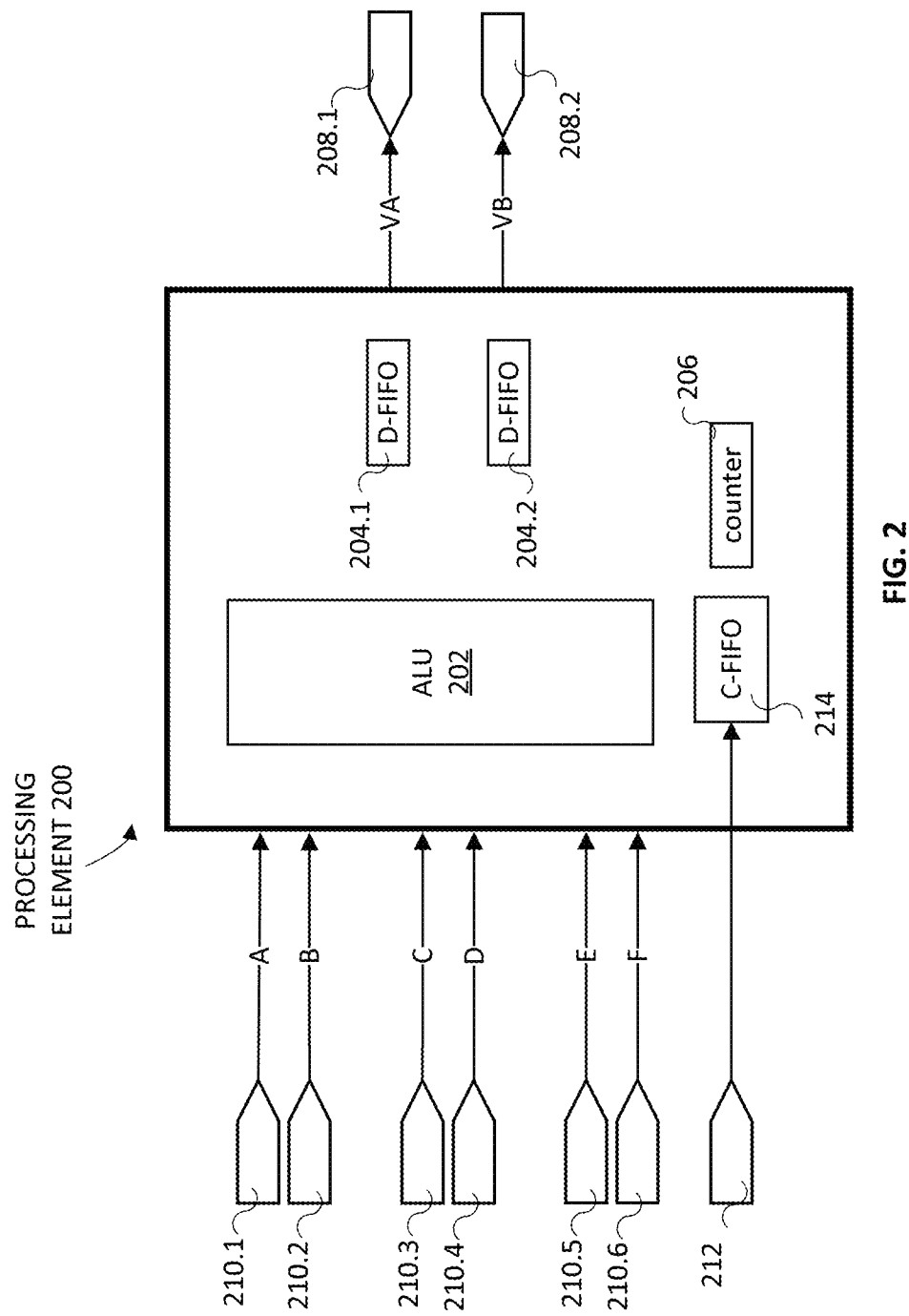
FIG. 2 schematically shows a processing element for a processor in accordance with an embodiment of the present disclosure.

FIG. 2 schematically shows a processing element (PE) 200 in accordance with an embodiment of the present disclosure. The PE 200 may be an embodiment of a PE 118. The PE 200 may comprise an Arithmetic Logic Unit (ALU) 202, a plurality of data buffers (e.g., D-FIFO 204.1, and 204.2), a counter 206, a plurality of data outputs (e.g., 208.1 and 208.2), a plurality of data inputs (e.g., 210.1 through 210.6), a configuration input 212 and a configuration buffer (e.g., C-FIFO 214). In one embodiment, the ALU 202 may be one ALU (e.g., one ALU that is configured to process one piece of data at a time and may be referred as a scalar ALU). In most embodiments, the ALU 202 may be a plurality of ALUs (or referred to as a vector ALU), for example, K ALUs, and Single Instruction Multiple Threads (SIMT) operation may be performed by the PE. As used herein, the capital letter K may be referred to as the vector size of ALU and an example K may be 32. It should be noted that the same vector size K may be applied in MPs, SBs, for example, for a vector register and a vector data bus. Please note that a scalar ALU may be a special case of a vector ALU with a vector size being one.

Data received from the data inputs 210.1 through 210.6 may be denoted as A, B, C, D, E, and F. Data sent to the data outputs 208.1 and 208.2 may be denoted as VA and VB. In an embodiment in which the ALU 202 may be one ALU, the widths of the data inputs 210.1 through 210.6 and the data outputs 208.1 and 208.2 may be M bits. The width of the ALU may be configured to be either M bits (one word) or 2×M bits (two words) by the configuration. If the width is M bits, the inputs of the ALU are A, B, and C. The output of the ALU is VA. If the width is 2×M bits, the inputs of the ALU are (B, A), (D, C) and (F, E). The output of the ALU is (VB, VA). Here (,) denotes concatenation of M-bit data. For example, when M is 8, inputs and outputs of ALU may be 8 bits or 16 bits; when M is 16, inputs and outputs of ALU may be 16 bits or 32 bits; when M is 32, inputs and outputs of ALU may be 32 bits or 64 bits; and so on. Input data A, B, C, D, E, and F, and output data VA and VB may be M bits. In an embodiment in which the ALU 202 may be a vector ALU, the data inputs 210.1 through 210.6 and the data outputs 208.1 and 208.2 may be vectors of K×M bits. And input data A, B, C, D, E, and F, and output data VA and VB may be vectors of K×M bits.

The data buffers 204.1 and 204.2 may be coupled to the data outputs 208.1 and 208.2 to temporarily store output data. The data buffers 204.1 and 204.2, which may be mapped to the vector registers VA and VB, respectively, may be used to decouple the timing of PEs from that of the succeeding SBs or the gasket memory. In one embodiment, the buffers may be implemented as FIFOs (e.g., a D-FIFO for a data buffer, a C-FIFO for a configuration buffer).

The configuration buffer C-FIFO 214 may receive configurations from the configuration input 212, which may be coupled externally to the sequencer 106 via the configuration bus, and store the received configurations before any execution of a data path starts. The configurations for the PE 200 may be referred to as PE configurations. The PE 200 may be statically configured while processing a thread block, e.g., the PE 200 may be programmed with instructions specified in the configuration to perform one stage of a pipeline. No instructions may be changed while data in the thread block are passing through the PE 200. One of the configuration parameters XYZ may be used to obtain the number of executions which may be specified by ceil (XYZ/K). Here function ceil(x) returns the least integer value greater than or equal to x. The counter 206 may be programmed with the number of executions and used to count the data passing through the data output 208.1. When the counter value has reached the number of executions, a new configuration may be applied. Therefore, reconfiguration capability may be provided in each PE. In one embodiment, the specified number of executions for an instruction may be referred to as NUM_EXEC, K threads concurrently executed may be referred to as a warp and this NUM_EXEC may be equal for all components in one data path. For example, for a thread block with the number of threads TH=1024 threads, NUM_EXEC=ceil (1024/32)=32. The counter 206 may be referred to as a warp counter.

Figure 3:
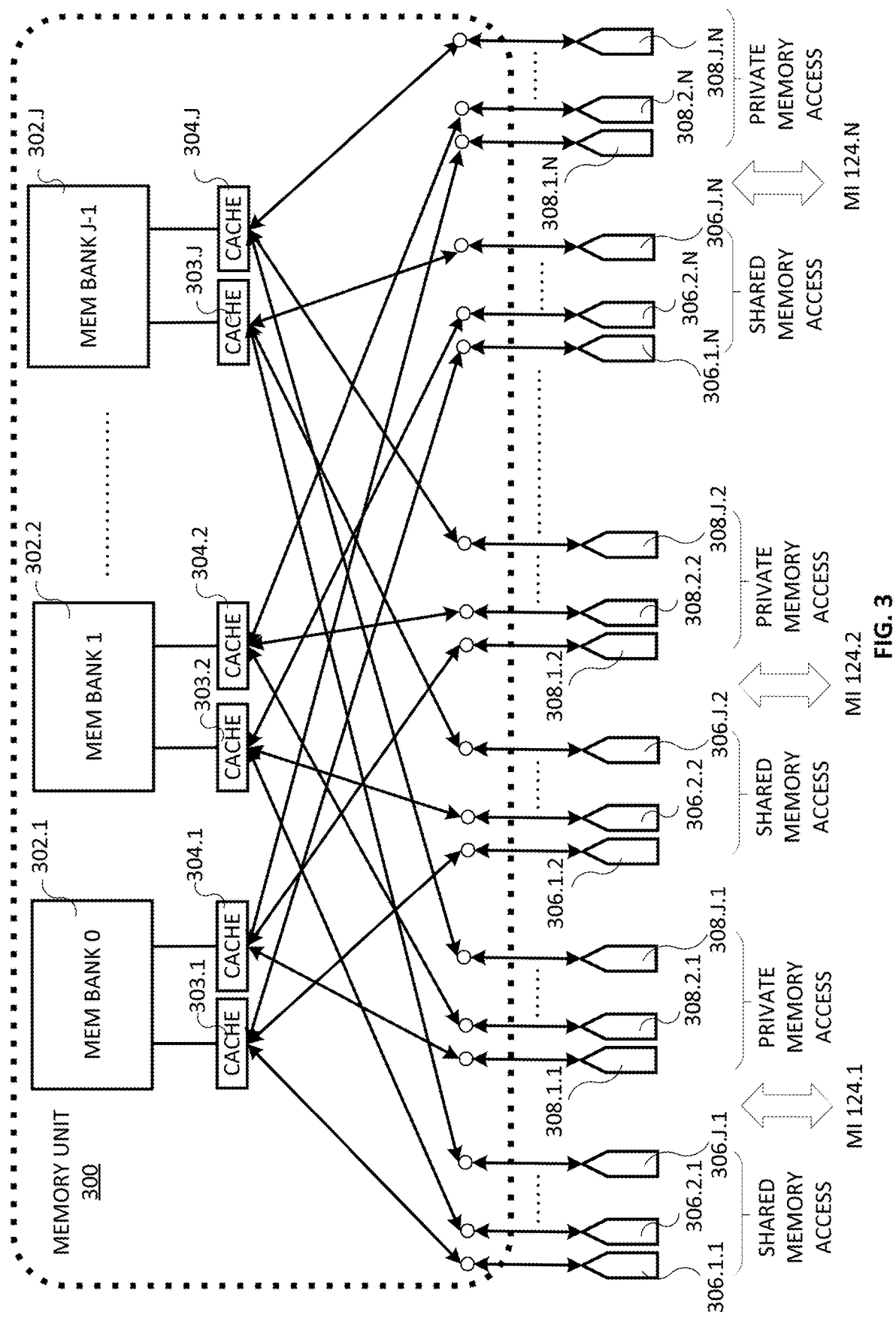
FIG. 3 schematically shows a memory unit for a processor in accordance with an embodiment of the present disclosure.

FIG. 3 schematically shows a memory unit 300 for the processor 100 in accordance with an embodiment of the present disclosure. The memory unit 300 may be an embodiment of the memory unit 112 and may serve as an on-chip cache for the PE array 114. The memory unit 300 may comprise a plurality of memory banks (e.g., memory bank 0 denoted as 302.1, memory bank 1 denoted as 302.2, memory bank J−1 denoted as 302.J, etc.), a plurality of memory caches 303.1 through 303.J for shared memory access and a plurality of memory caches 304.1 through 304.J for private memory access. The caches 303.1-303.J and 304.1-304.J may also be referred to as cache blocks. Each of the memory banks 302.1 through 302.J may be coupled to a respective cache 303 for shared memory access and a respective cache 304 for private memory access. For example, the memory bank 302.1 may be coupled to the cache 303.1 and cache 304.1, the memory bank 302.2 may be coupled to the cache 303.2 and cache 304.2, and so on until the memory bank 302.J may be coupled to the cache 303.J and 304.J. In one embodiment, the memory unit 300 may be a J-way interleaved memory where J may be a power of 2.

Storage locations in the memory unit 300 may be identified by memory addresses. In one embodiment, a certain segment of a memory address may be used to select a memory bank and the rest of the memory address, which may be referred to as a bank address, may be used to identify the location in the memory bank. The segment of the memory address for selecting the memory bank may be referred to as bank selection bit(s) and have a bit width of L, which may be equal to the bit width of J minus 1 (e.g., L is $\log_2$ (J)) in the embodiment J being a power of 2. Therefore, a memory address may refer to a full address, and a bank address may refer to the portion of a memory address without the bank selection bits.

In some embodiments, the memory unit 300 may be word addressable. That is, each word in the memory unit 300 may be uniquely pointed to or identified by a memory address and a storage location may be an addressable word location. In one example, referred to as memory example one, the number J may be eight (8) and L may be three, the three (3) Least Significant Bits (LSBs) of a memory address may be used as the bank selection bits and other bits may be used as a bank address. If the memory bank is 64 bits wide and a word of data that a bank address is pointing to is 16 bits (assuming the word size of ALUs in the PE 118 is 16 bits), 64 bits in the memory bank may hold 4 words of 16-bit data. It should be noted that 2 bits of the bank address of each memory bank may be position bits and indicate the position of the word of 16-bit data (e.g., bits [1:0] of the bank address point to a 16-bit word at positions 3, 2, 1 or 0) and the rest of the bank address may be an address that may point to a memory location of 64-bit data in the memory bank. For example, a decimal memory address 15 has "1111" as the last four bits of its binary representation and other bits being zero, the three LSBs are "111", the two position bits are "01", and the rest of the memory address is zero so that this decimal memory address may point to the second word of the 64-bit data at address 0 in memory bank 7. Therefore, an address may refer to the portion of a bank address without the position bits.

In some embodiments, the memory unit 300 may be byte addressable. That is, each byte in the memory unit 300 may be uniquely pointed to or identified by a memory address, and a storage location may be an addressable byte location. As an example, the bank selection bit(s) of a memory address may be used to select a memory bank and other bits may be used as a bank address. If the memory bank is (K/J)×M bits wide, data in the memory bank may hold (K/J)×(M/8) bytes. A segment of the bank address may be used to select a byte position and rest of the bank address may be used to identify an address that may point to a memory location of (K/J)×M-bit data in the memory bank. If the word size is W (=M/8) bytes and W is greater than 1, the memory address may comprise data size bit(s) whose bit width is equal to the bit width of W−1 (i.e., log 2 (W)). The data size bit(s) may indicate the size of data in the memory in bytes and may be all "0" when the data size is W bytes. The data size and the bit width of the data size bit(s) may be denoted by DS and DSW, respectively. The data size may be a power of 2. The memory address must be divisible by DS. If the data size is W bytes (DS=W), the DSW-bit LSBs of the memory address are zero and the rest of the memory address is equivalent to the memory address of the word addressable memory unit. When W is greater than DS, for a data loading process, the higher W-DS bytes of data returned from the memory unit may be filled with zeros, and for a data storing process, the higher W-DS bytes of data sent to the memory unit may be ignored.

In one example, referred to as memory example two, for a 25-bit memory address, with the word size being 2 bytes (W=2 and M=16), the data size bit being 1 bit, the bit width of the memory being 64 bits (4 words) and the number of memory bank J being 8, the bit [0] of the memory address may identify a byte in a word (e.g., a higher byte or a lower byte), bits [3:1] of the memory address may be the bank selection bits and identify a bank out of 8 banks, bits [5:4] of the memory address may be the position bits and identify a word out of 4 words of a 64-bit data, and the rest of the memory address may be an address that may point to a memory location of a 64-bit data in the memory bank. As an example, a memory address 122 may point to byte 6 (e.g., bit [0]=0, bits [5:4]=3) at address 1 (e.g., bits [24:6]=1) in bank 5 (e.g., bits [3:1]=5) if DS is 1 or point to word 3 (byte 7 and byte 6) at address 1 in bank 5 if DS is 2.

It should be noted that J being 8 and memory bank width being 64 are just an example, and J and memory bank width may be other numbers in various embodiments. Also, the number of bits used for bank selection may be dependent on the number of memory banks in the memory unit 300. When J is 8, 3 bits may be used for bank selection because 3 bits may have a value range of zero (0) to seven (7).

Each cache 303 may be individually coupled to all of the plurality of MIs 124.1-124.N for shared memory access via connection ports 306, and each cache 304 may be individually coupled to all of the plurality of MIs 124.1-124.N for private memory access via connection ports 308. Each of the connection ports 306 and 308 may use two subscriptions to identify its connection, with the first subscription identifying the memory cache (by the memory cache subscription 1 to J) and the second subscription identifying the MI (by the MI subscription 1 to N). For example, the connection port 306.1.1 may be for shared memory access for memory cache 303.1 and MI 124.1, the connection port 306.2.1 may be for shared memory access for memory cache 303.2 and MI 124.1, and so on until the connection port 306.J.1 may be for shared memory access for memory cache 303.J and MI 124.1; the connection port 306.1.2 may be for shared memory access for memory cache 303.1 and MI 124.2, the connection port 306.2.2 may be for shared memory access for memory cache 303.2 and MI 124.2, and so on until the connection port 306.J.2 may be for shared memory access for memory cache 303.J and MI 124.2; the connection port 306.1.N may be for shared memory access for memory cache 303.1 and MI 124.N, the connection port 306.2.N may be for shared memory access for memory cache 303.2 and MI 124.N, and so on until the connection port 306.J.N may be for shared memory access for memory cache 303.J and MI 124.N.

Similarly, the connection port 308.1.1 may be for private memory access for memory cache 304.1 and MI 124.1, the connection port 308.2.1 may be for private memory access for memory cache 304.2 and MI 124.1, and so on until the connection port 308.J.1 may be for private memory access for memory cache 304.J and MI 124.1; the connection port 308.1.2 may be for private memory access for memory cache 304.1 and MI 124.2, the connection port 308.2.2 may be for private memory access for memory cache 304.2 and MI 124.2, and so on until the connection port 308.J.2 may be for private memory access for memory cache 304.J and MI 124.2; the connection port 308.1.N may be for private memory access for memory cache 304.1 and MI 124.N, the connection port 308.2.N may be for private memory access for memory cache 304.2 and MI 124.N, and so on until the connection port 308.J.N may be for private memory access for memory cache 304.J and MI 124.N.

It should be noted that both the number of caches 303 and the number of caches 304 may match the number of memory banks, denoted by capital letter J. And the number of M is 124 may match the number of columns, denoted by capital letter N. The number of memory banks does not need to be identical to the vector size. For example, a vector (e.g., vector ALU, vector address, vector data) may have a vector size K, a PE array may have a number of columns N, and a memory unit may have a number of memory banks J. And K, N and J may be all different. In one embodiment, K may be divisible by J, J may be a power of 2, and the bit width of J minus 1 may be L (e.g., L is log 2 (J)). For example, J and L may be eight (8) and three (3), respectively, K may be 32 and N may also be 32.

The shared memory mode may allow random memory access. Suppose the vector size of data path is K. Then, the bit width of shared memory address bus may be K×G where G is the bit width of address space (e.g., 25 as in memory example two). The memory address may be specified by using vector registers. An example of assembly code for loading data in shared memory mode is a load instruction, for example, LOAD [DVA+VA], DEST to be executed by a MP, in which DVA, VA and DEST may be vector registers. DVA may contain K base addresses and VA may provide K address offsets. DVA and VA may be updated by the MP and the PE in the preceding column, respectively. The addition of DVA and VA may be performed by a vector ALU in a MP (e.g., ALU 718 of MP 120.2). DEST may be the destination of K words of data loaded from the memory unit 300, which may be an output data port of the SB in the same column (e.g., any one of data ports 526.1 through 526.8 of SB 122.2) or the input data port MA of the SB in the same column (e.g., 502.1 of SB 120.2) which may be forwarded to the PE in the same column (e.g., 210.1 of PE 118.2 via 506.1 of SB 120.2). If some of K memory addresses are directed to a same memory bank, the memory interface may resolve the contention and allocate multiple cycles to load from the memory bank.

For example, if the LOAD instruction is to be executed by MP 120.2, DVA and VA may be updated by MP 120.1 and PE 118.1 in the preceding column, respectively. DVA may be a vector register mapped to the output address buffer of the MP in the preceding column (e.g., output address buffer 720 of MP 120.1), and VA may be a vector register mapped to the output data buffer of the PE in the preceding column (e.g., output data buffer 204.1 of PE 118.1). DEST may be one of vector registers IA through IH mapped to the output data buffers of the SB in the same column as the MP executing the LOAD instruction (e.g., one of output data buffers 522.7 through 522.14 of SB 122.2) or a virtual vector register MA mapped to the read data connection of the shared memory port from the MP to the SB in the same column as the MP (e.g., connection between ports 728 of MP 120.2 and 502.1 of SB 122.2).

In some embodiments, in a private memory access mode, data for parallel threads may be stored in memory unit 300 in consecutive memory addresses. It should be noted that although the memory addresses may be consecutive, the storage locations pointed to by the memory addresses may actually spread across multiple memory banks. For example, if there are 32 ALUs in a PE 118 to execute 32 threads in parallel (e.g., a warp) and each ALU is configured to operate on a 16-bit word of data, the vector data bus may have a size of 32 times 16 bits (512 bits in total). For memory example one, because the three LSBs of each memory address select a memory bank, consecutive memory addresses may point to different memory banks. As an example, if the word of data for the first thread (e.g., thread 0) is stored at memory address 15, the range of consecutive memory addresses for 32 words of data may be from 15 to 46. The word for memory address 15 may be located at position 1 (e.g., bits [31:16]) of 64-bit data at address 0 of bank 7. The word for the next thread (e.g., thread 1) may be stored at memory address 16, which has two bits of position as "10" and 3 bits LSBs as "000" and may point to the word at position 2 (e.g., bits [47:32]) of 64-bit data at address 0 of bank 0. And the word for the next thread (e.g., thread 2) may be stored at memory address 17, which has two bits of position as "10" and 3 bits LSBs as "001", which may point to the word at position 2 (e.g., bits [47:32]) of 64-bit data at address 0 of bank 1. It may be deduced that other words at positions 2 and 3 of 64-bit data at address 0 of bank 7 may be for memory addresses 23 and 31 which may be words for 9th and 17th threads (e.g., threads 8 and 16), respectively, and the word at position 0 of 64-bit data at address 1 of bank 7 may be for memory address 39 and for 25th thread (e.g., thread 24). And another word at position 3 of 64-bit data at address 0 of bank 0 may be for memory address 24 and for 10th thread (e.g., thread 9). Moreover, the words at positions 0 and 1 of 64-bit of data at address 1 of bank 0 may be for memory addresses 32 and 40, and for 18th and 26th threads (e.g., threads 17 and 25), respectively.

A memory address directed to a memory bank may be associated with 3 more memory addresses directed to the same memory bank and may access 64-bit data (4 words of data), which may be identified by the 4 memory addresses and stored in 1 memory location or 2 consecutive memory locations. The 4 words of data may be in one memory location if the first word of the four words is positioned at the beginning of the memory location (e.g., at the first word of the memory location), or in two consecutive memory locations if the first word of the four words is not positioned at the beginning of the memory location (e.g., at the second word, third word or fourth word of the memory location). For example, memory addresses 15, 23, 31 and 39 may be directed to the same memory bank 7. Therefore, the memory address 15 may be associated with memory addresses 23, 31 and 39 and used to access 4 words of data with one word for thread 0, another word for thread 8, another word for thread 16 and yet another word for thread 24, respectively. The memory address 15 directed to bank 7 may point to 3 words at position 1 (e.g., bits [31:16]), position 2 (e.g., bits [47:32]) and position 3 (e.g., bits [63:48]) of the memory location at address 0 for memory addresses 15, 23 and 31, respectively, and a word at position 0 (e.g., bits [15:0]) of the memory location at address 1 for memory address 39. A memory interface may remove bank selection bits from the memory address 15 and provide bank address 1 to the memory bank 7.

The memory addresses directed to memory banks 0 to 7 may be 16, 17, 18, 19, 20, 21, 22, and 15, respectively. The private memory access interface may generate 8 bank addresses from one scalar memory address. The bank addresses provided to memory banks 0 to 7 are 2, 2, 2, 2, 2, 2, 2 and 1, respectively. The bits [47:0] of 64-bit data for the memory address 15 may be stored in bits [63:16] of data at address 0 of bank 7 and bits [63:48] may be stored in bits [15:0] of data at address 1 of bank 7. The bits [31:0] of 64-bit data for the memory address 16 may be stored in bits [63:32] of data at address 0 of bank 0 and bits [63:32] may be stored in bits [31:0] of data at address 1 of bank 0. Similarly, the bits [31:0] of 64-bit data for the memory addresses 17 to 22 may be stored in bits [63:32] of data at address 0 of banks 1 to 6 and bits [63:32] may be stored in bits [31:0] of data at address 1 of banks 1 to 6.

Because words of 16-bit data from consecutive memory addresses may be interleaved among 8 memory banks, for a data loading process operation, a memory interface 124 may collect 64-bit data from each memory bank, split each of 64-bit data into 4 words of 16-bit data, and deinterleave 8 of 4 words of 16-bit data to organize a 512-bit vector for the output by placing bits [15:0] of the data from memory bank 7, bank 0, bank 1, . . . , and bank 6 to bits [15:0], bits [31:16], bits [47:32], . . . , and bits [127:112] of the 512-bit vector, respectively, then placing bits [32:16] of the data from memory bank 7, bank 0, bank 1, . . . , and bank 6 to bits [143:128], bits [159:144], bits [175:160] . . . , and bits [255:240] of the 512-bit vector, respectively, and so on.

For memory example two, the word size may be 2 bytes (W=2) and the vector data bus may have a size of 32 times 16 bits (512 bits in total). To load/store one vector data of 512 bits from/to the memory unit, there may be 32 consecutive memory addresses if DS is 1, or 32 consecutive even memory addresses if DS is 2.

In an example with DS being 2, if two bytes of data for the first thread is located at memory address 122, the range of corresponding memory addresses for all 512 bits of data is from 122 to 184 (e.g., even consecutive memory addresses). The memory addresses directed to memory banks 0 to 7 are 128, 130, 132, 134, 136, 122, 124 and 126, respectively. The bank addresses provided to memory banks 0 to 7 are 16, 16, 16, 16, 16, 14, 14 and 14, respectively. The addresses and banks where 512 bits of data are stored are: for bits [399:384], bits [271:256] and bits [143:128], bits [47:0] of data at address 2 of bank 5; for bits [15:0], bits [63:48] of data at address 1 of bank 5; for bits [415:400], bits [287:272] and bits [159:144], bits [47:0] of data at address 2 of bank 6; for bits [31:16], bits [63:48] of data at address 1 of bank 6; for bits [431:416], bits [303:288] and bits [175:160], bits [47:0] of data at address 2 of bank 7; for bits [47:32], bits [63:48] of data at address 1 of bank 7; for bits [447:432], bits [319:304], bits [191:176] and bits [63:48], 4 words of data at address 2 of bank 0; for bits [463:448], bits [335:320], bits [207:192] and bits [79:64], 4 words of data at address 2 of bank 1; for bits [479:464], bits [351:336], bits [223:208] and bits [95:80], 4 words of data at address 2 of bank 2; for bits [495:480], bits [367:352], bits [239:224] and bits [111:96], 4 words of data at address 2 of bank 3; for bits [511:496], bits [383:368], bits [255:240] and bits [127:112], 4 words of data at address 2 of bank 4.

In another example with DS being 1, if one byte of data for the first thread is located at memory address 122, the range of corresponding memory addresses for all 512 bits of data is consecutive memory addresses from 122 to 153. The memory addresses directed to memory banks 0 to 7 are 128, 130, 132, 134, 136, 122, 124 and 126, respectively. The bank addresses provided to memory banks 0 to 7 are 16, 16, 16, 16, 16, 14, 14 and 14, respectively. The addresses and banks where 512 bits of data are stored are: for bits [391:384] and bits [263:256], bits [15:0] of data at address 2 of bank 5; for bits [135:128] and bits [7:0], bits [63:48] of data at address 1 of bank 5; for bits [407:400] and bits [279:272], bits [15:0] of data at address 2 of bank 6; for bits [151:144] and bits [23:16], bits [63:48] of data at address 1 of bank 6; for bits [423:416] and bits [295:288], bits [15:0] of data at address 2 of bank 7; for bits [167:160] and bits [39:32], bits [63:48] of data at address 1 of bank 7; for bits [439:432], bits

[311:304], bits [183:176] and bits [55:48], bits [31:0] of data at address 2 of bank 0; for bits [455:448], bits [327:320], bits [199:192] and bits [71:64], bits [31:0] of data at address 2 of bank 1; for bits [471:464], bits [343:336], bits [215:208] and bits [87:80], bits [31:0] of data at address 2 of bank 2; for bits [487:480], bits [359:352], bits [231:224] and bits [103:96], bits [31:0] of data at address 2 of bank 3; for bits [503:496], bits [375:368], bits [247:240] and bits [119:112], bits [31:0] of data at address 2 of bank 4. All higher bytes of 32 words of data, bits [511, 504], bits [495, 488], bits [31,24], and bits [15,8] may be set to 0 for a data loading process or ignored for a data storing process.

Figure 4A:
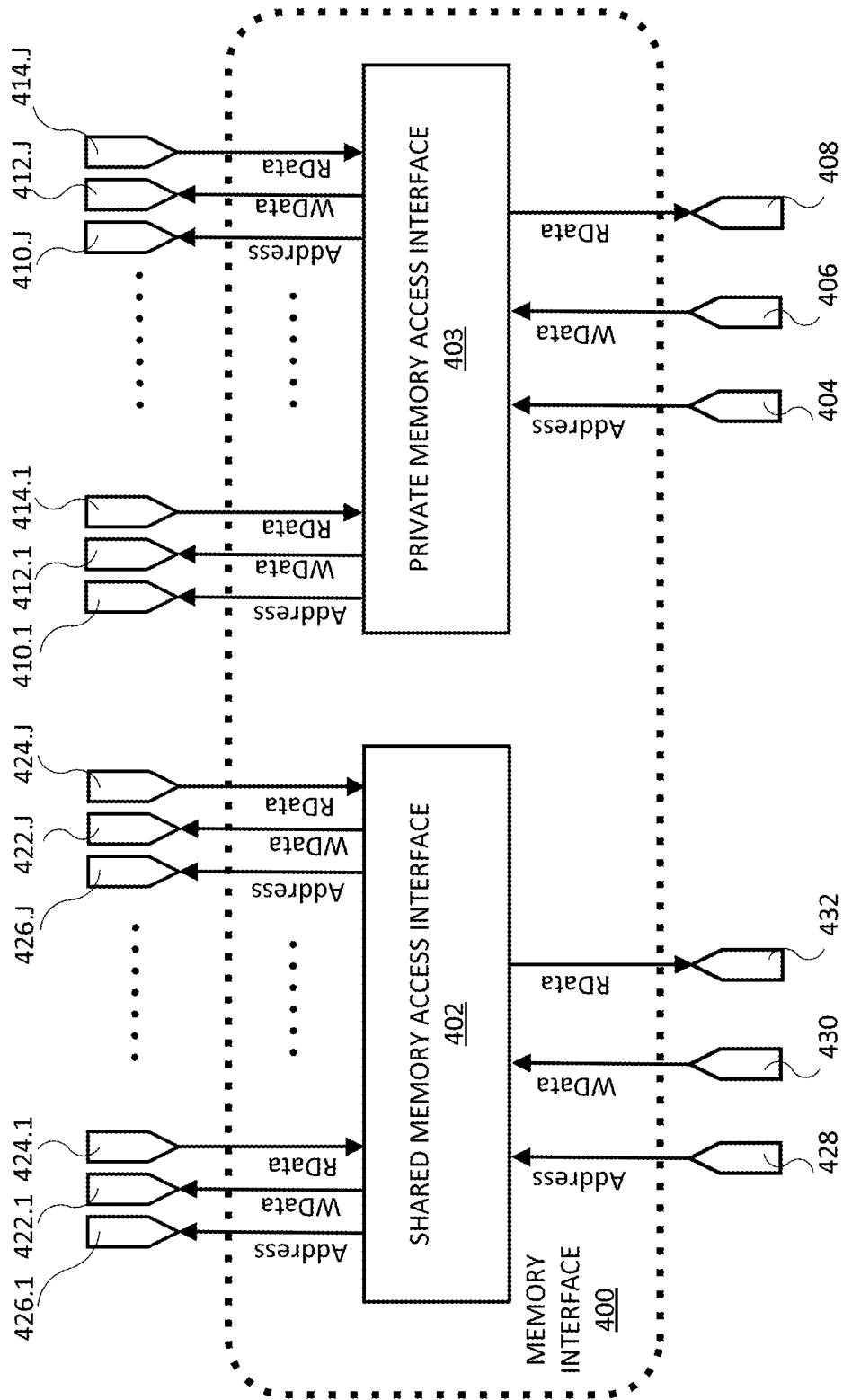
FIG. 4A schematically shows a memory interface in accordance with an embodiment of the present disclosure.

FIG. 4A schematically shows a memory interface (MI) 400 in accordance with an embodiment of the present disclosure. The MI 400 may be an embodiment of MI 124 of FIG. 1. In some embodiments, the memory interface may be referred to as a root box. The MI 400 may comprise a shared memory access interface 402 for shared memory access mode and a private memory access interface 403 for private memory access mode. The private memory access interface 403 may comprise an address port 404, a write data (WData) port 406 and a read data (RData) port 408 coupled to a memory port. The private memory access interface 403 may also comprise a plurality of address ports 410.1-410.J, a plurality of WData ports 412.1-412.J and a plurality of RData ports 414.1-414.J coupled to the memory unit 300. The shared memory access interface 402 may comprise an address port 428, a WData port 430 and a RData port 432 coupled to a memory port. The shared memory access interface 402 may also comprise a plurality of address ports 426.1-426.J, a plurality of WData ports 422.1-422.J and a plurality of RData ports 424.1-424.J coupled to the memory unit 300.

For connections to the memory unit 300, a set of address, WData and RData buses may be coupled to one connection port 306.1.1-306.J.N and 308.1.1-308.J.N shown in FIG. 3. For example, the address port 410.1, WData port 412.1 and RData port 414.1 of MI 124.1 may be coupled to the connection port 308.1.1 of the memory unit 300; the address port 410.J, WData port 412.J and RData port 414.J of MI 124.1 may be coupled to connection port 308.J.1. Meanwhile, the address port 410.1, WData port 412.1 and RData port 414.1 of MI 124.N may be coupled to the connection port 308.1.N of the memory unit 300; the address port 410.J, WData port 412.J and RData port 414.J of MI 124.N may be coupled to connection port 308.J.N Similarly, the address port 426.1, WData port 422.1 and RData port 424.1 of MI 124.1 may be coupled to the connection port 306.1.1 of the memory unit 300; the address port 426.J, WData port 422.J and RData port 424.J of MI 124.1 may be coupled to connection port 306.J.1. Meanwhile, the address port 426.1, WData port 422.1 and RData port 424.1 of MI 124.N may be coupled to the connection port 306.1.N of the memory unit 300; the address port 426.J, WData port 422.J and RData port 424.J of MI 124.N may be coupled to connection port 306.J.N.

In one embodiment, each of the WData ports and RData ports coupled to a memory port may be configured for vector data connections. For example, the WData port 406 may be a K×M-bit input port, and the RData port 408 may be a K×M-bit output port.

In some embodiments, the address port 404 may be configured for a vector address. But this is not necessary for all embodiments. In the private memory access mode, K memory addresses in one vector address for one warp may be continuous in ascending order in accordance with the thread ID. Thus, in one embodiment, only a scalar memory address for the thread with the smallest thread ID of all threads of a warp may need to be sent from a MP to a MI. Therefore, in such an embodiment, the address port 404 may be configured for a scalar memory address, and the width of the address port 404 may be G bits.

Also, assuming J is less than or equal to K, the width of data ports of each bank (e.g., 412 and 414) may be (K/J)×M bits. Since the memory unit 300 may be a J-way interleaved memory, L-bit bank selection of the memory address may determine the memory bank where data for the memory address may reside. Here L may be the bit width of J minus 1. The bank selection bits of memory example one and memory example two may be bits [2:0] and bits [3:1] of a memory address, respectively. All K words in one vector data may be evenly distributed among memory banks and accessible without memory contention.

In the shared memory access mode, K memory addresses in one vector address may be different from each other. Data accessed by the vector address may be randomly spread in all memory banks which may result in memory contention. The width of the address port 428 may be K×G bits. The width of data ports of each bank (e.g., 422 and 424) may be M bits. The shared memory access interface 402 may resolve the memory contention.

Figure 4B:
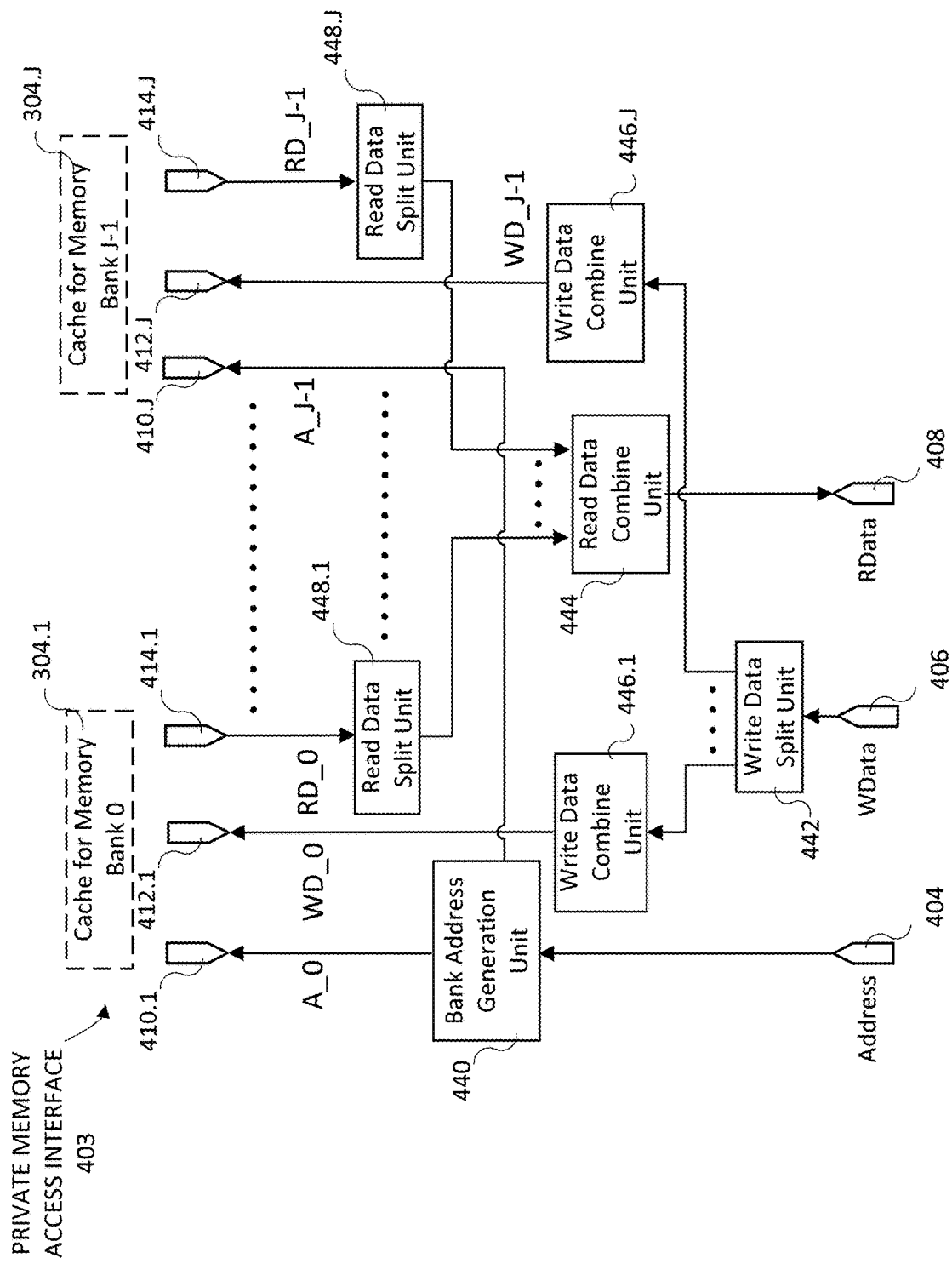
FIG. 4B schematically shows a private memory access interface in accordance with an embodiment of the present disclosure.

FIG. 4B schematically shows the private memory access interface 403 for private memory access in accordance with an embodiment of the present disclosure. The width of the vector data at WData port 406 and at RData port 408 may be K×M bits. The vector data may be split into K words of M-bit data which may be indexed from 0 to K−1 in the order of corresponding thread IDs of K words. The width of the scalar memory address received at the address port 404 may be G bits. The memory bus coupled to the address port 404 may be referred to as the private memory address bus. In the embodiments where the memory unit is a byte addressable memory unit, the private memory address bus may also include the data size bit(s) (not shown in FIG. 4B). That is, when the memory unit 112 is a byte addressable memory unit embodiment, the address port 404 may be G+DSW bits where DSW is the bit width of the data size bit(s). The memory address of each of K words may be calculated by adding the index of the word (e.g., 0 to K−1) to the scalar memory address at address port 404, if the memory unit is word addressable; or by adding the index multiplied by DS to the scalar memory address at address port 404, if the memory unit is byte addressable where DS is the size of data in bytes.

A bank address generation unit 440 of the private memory access interface 403 may generate K memory addresses, examine the L-bit bank selection bit(s) of each of K memory addresses, and group them by the index of the memory bank specified by the bank selection bit(s). In each group, the smallest memory address may be selected then the bank selection bits of the memory address may be removed. The remaining G minus L (G−L) bits and, for the byte addressable memory unit, data size bit(s) may be assigned to one of addresses A_0 through A_J−1 whose index matches the bank index of the group.

For a data storing process, a write data split unit 442 of the private memory access interface 403 may split K×M bits of data received at WData port 406 into K words of M-bit data and index them from 0 to K−1 in the order of corresponding thread IDs of K words. The bank address generation unit 440 may calculate the memory addresses of K words and group them by the bank index specified by the bank selection bit(s). The words whose addresses belong to the same group may be sent to one of write data combine units 446.1 through 446.J of the private memory access interface 403, whose index matches the bank index of the group. Each of the write data combine units 446 combines words in the group in the order of the indexes of the words. The combined data of each group may be assigned to one of write data WD_0 through WD_J−1 and transferred to memory banks via one of output ports 412.1 through 412.J. For a data loading process, (K/J)×M bits of read data RD_0 through RD_J−1 may be received from memory banks via input ports 414.1 through 414.J. Each read data may be assigned to the group whose bank index matches the index of the read data port then split into K/J words of M-bit data by one of read data split units 448.1 through 448.J of the private memory access interface 403. The index of each word in the group may be retrieved from the index of the address of the word generated in the bank address generation unit 440. K words from all J groups may be rearranged in the order of the index of each word then K words may be combined by a read data combine unit 444 of the private memory access interface 403. A K×M-bit data vector may be formed and assigned to RData port 408.

Figure 4C:
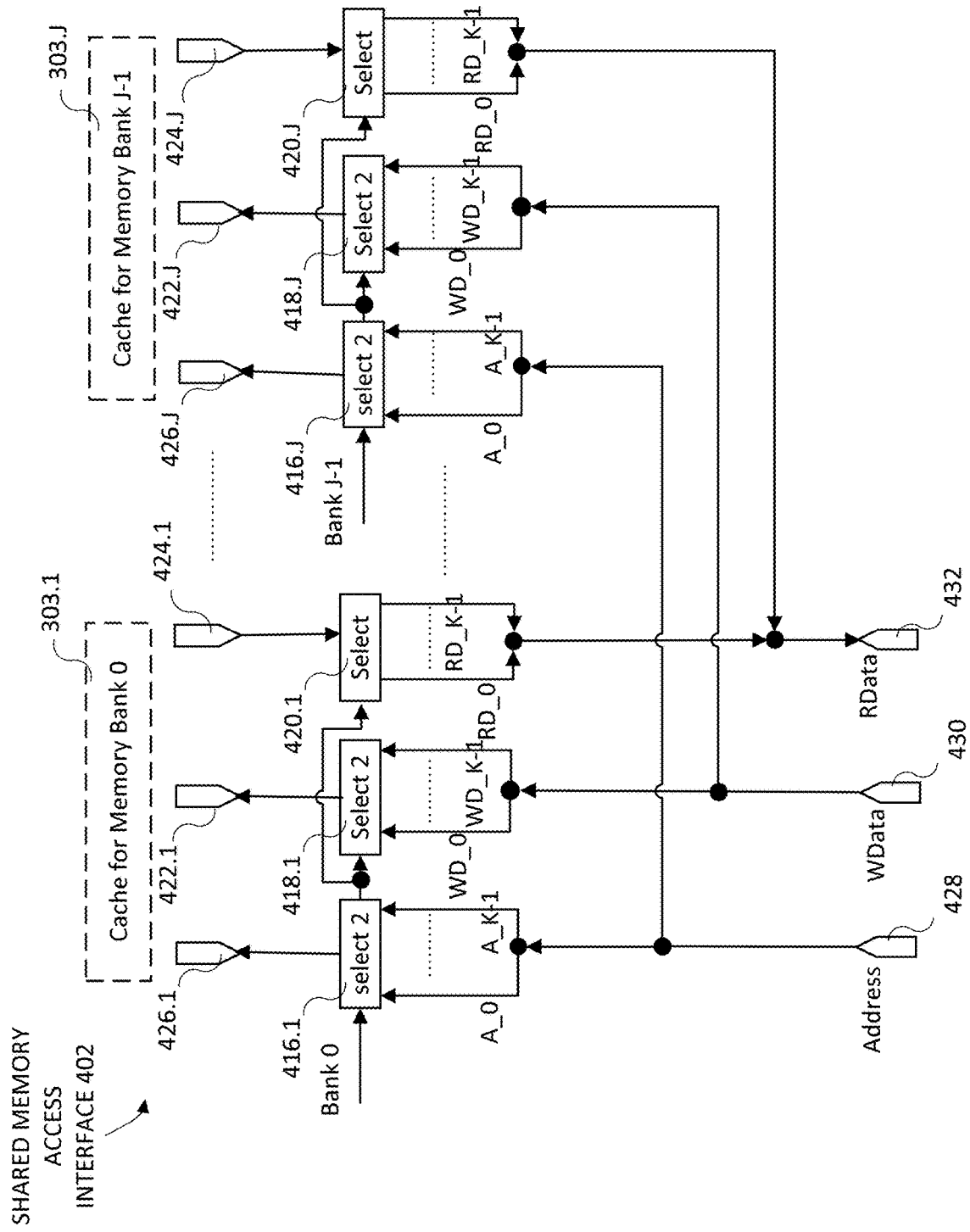
FIG. 4C schematically shows a shared memory access interface in accordance with an embodiment of the present disclosure.

FIG. 4C schematically shows the shared memory access interface 402 for shared memory access in accordance with an embodiment of the present disclosure. The address port 428 may be configured for a vector address of K×G bits, for example, K addresses of G bits as A_0, A_1, . . . , A_K−1. The number K may correspond to the vector size K of the vector ALU in a PE 118. The K addresses may be delivered to a plurality of address selection units (e.g., "Select 2" units 416.1 through 416.J). Each address selection unit 416.1 through 416.J may take the index of each memory bank as an input, for example, index 0 for "Bank 0", . . . , and index J−1 for "Bank J−1", scan the addresses from A_0 to A_K−1, pick up all addresses whose bank selection bits match the bank index, and send remaining G−L bits of the addresses one by one to the memory bank through the address port 426 (e.g., address port 426.1 for memory bank 0 cache 303.1, address port 426.J for memory bank J−1 cache 303.J, etc.). The width of the address port 426 may be G−L bits.

Because more than one address may be directed to the same memory bank, write data selection units (e.g., "Select 2" units 418.1 through 418.J) and read data selection units (e.g., "Select" units 420.1 through 420.J) may be provided to match the data being written to or read from the memory bank with the address sent to the memory bank. Each of the write data selection unit 418.1 through 418.J may receive the index of each address (e.g., 0 to K−1) sent to a corresponding address port 426.1 through 426.J from a corresponding address selection unit 416.1 through 416.J, and send one of the write data (e.g., WD_0 through WD_K−1) with the same index to WData port 422.1 through 422.J (e.g., WData port 422.1 for memory bank 0 cache 303.1, WData port 422.J for memory bank J−1 cache 303.J, etc.). For example, if the address selection unit 416.1 sends G−L bits of A_2, A_15, and A_28 to address port 426.1, the write data selection unit 418.1 receives indices 2, 15, and 28, and sends WD_2, WD_15, and WD_28 to WData port 422.1. Each of the read data selection unit 420.1 through 420.J may receive the index of each address (e.g., 0 to K−1) sent to a corresponding address port 426.1 through 426.J from a corresponding address selection unit 416.1 through 416.J, and assign the data received from RData port 424.1 through 424.J (e.g., RData port 424.1 for memory bank 0 cache 303.1, RData port 424.J for memory bank J−1 cache 303.J, etc.) to one of the read data (e.g., RD_0 through RD_K−1) with the same index. For example, if the address selection unit 416.1 sends G−L bits of A_2, A_15, and A_28 to address port 426.1, the read data selection unit 420.1 receives indices 2, 15, and 28, and assigns the data received from RData port 424.1 to RD_2, RD_15, and RD_28.

Figure 5:
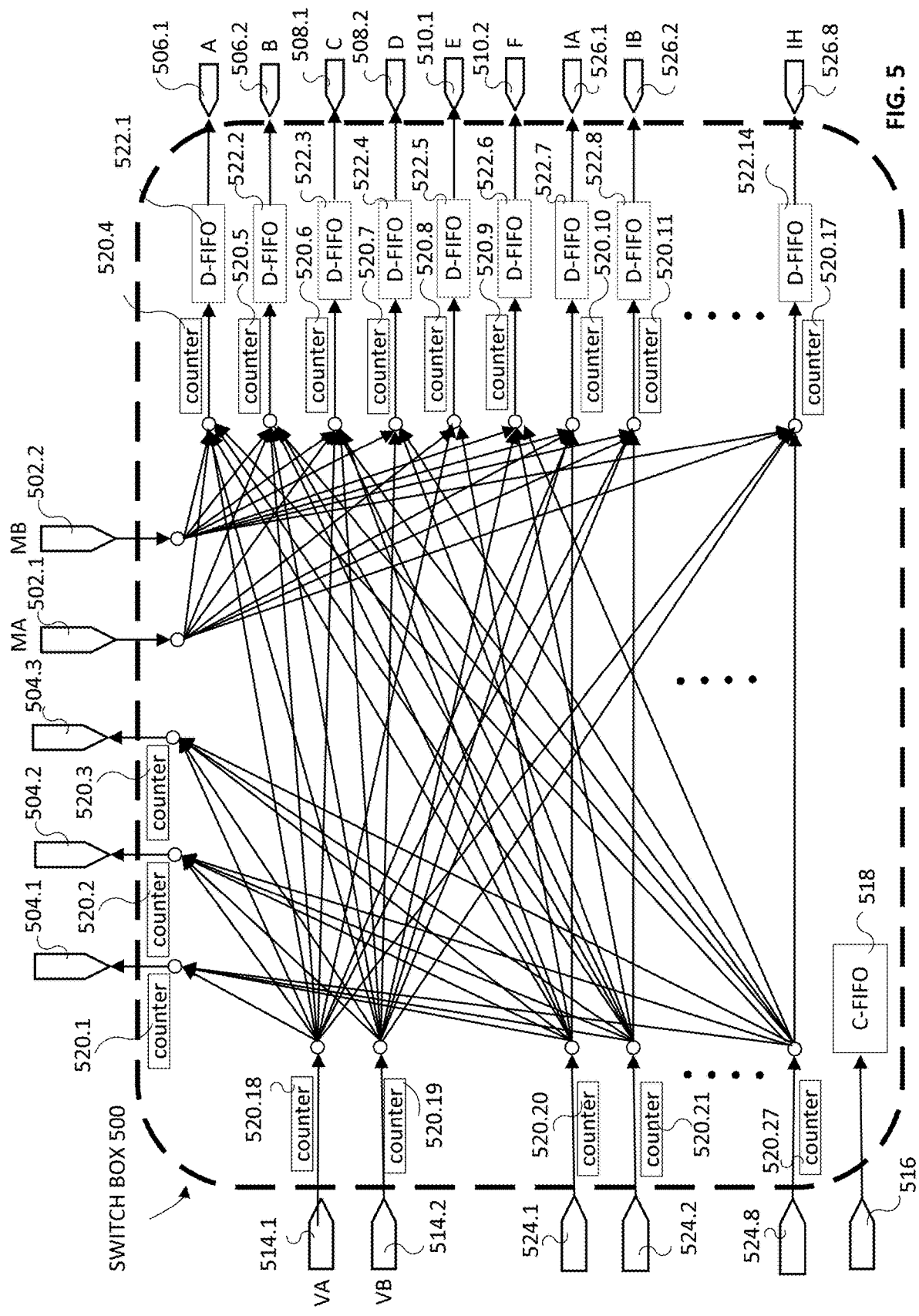
FIG. 5 schematically shows a switch box for a processor in accordance with an embodiment of the present disclosure.

FIG. 5 schematically shows a switch box (SB) 500 in accordance with an embodiment of the present disclosure. The SB 500 may be an embodiment of a SB 122 and may comprise a plurality of data inputs and data outputs, and inter-connections that couple the data inputs to data outputs for data switching. The data inputs of SB 500 may comprise data inputs 502.1, 502.2, 514.1, 514.2 and 524.1 through 524.8. The data outputs of SB 500 may comprise data outputs 504.1 through 504.3, 506.1, 506.2, 508.1, 508.2, 510.1, 510.2 and 526.1 through 526.8.

Externally, the data inputs 502.1 and 502.2 may be coupled to data outputs (e.g., read data ports) of a MP and mapped to the virtual vector registers MA and MB, respectively. One of them may be coupled to a private memory access data output and the other may be coupled to a shared memory access data output. The data output 504.1 may be coupled to a data input port of a MP. The data outputs 504.2 and 504.3 may be coupled to data inputs (e.g., write data ports) of a MP. One of them may be coupled to a private memory access write data port and the other may be coupled to a shared memory access write data port. The data inputs 514.1 and 514.2 may be coupled to data outputs 208.1 and 208.2 (e.g., labeled VA and VB) of a PE (or corresponding outputs of the gasket memory in case of SB 122.1), respectively. The data inputs 524.1 through 524.8 may be coupled to data outputs 526.1 through 526.8 of a SB of a preceding column (or corresponding outputs of the gasket memory in case of SB 122.1), respectively. The data outputs of 506.1, 506.2, 508.1, 508.2, 510.1, 510.2 may be coupled to data input ports 210.1 through 210.6 of a PE, respectively. Data from the data outputs 506.1, 506.2, 508.1, 508.2, 510.1 and 510.2 may be denoted as A, B, C, D, E, and F and data from the data inputs 514.1 and 514.2 may be denoted as VA and VB. A, B, C, D, E, and F may be input data to a PE 118 and VA and VB may be output data from a PE 118 as described herein.

The SB 500 may further comprise a configuration buffer 518 and a corresponding configuration input 516. The configuration buffer 518 may be implemented as a First-In-First-Out buffer and referred to as C-FIFO 518. The configuration input 516 may be coupled externally to the configuration bus that is coupled to the sequencer 106 for the SB 500 to receive configurations from the sequencer 106. The configurations for the SB 500 may be referred to as SB configurations. Moreover, the SB 500 may further comprise a plurality of counters 520.1-520.27. With the exception of the data inputs 502.1 and 502.2, each of other data inputs and all data outputs may have a corresponding counter 520. In addition, the SB 500 may also comprise a plurality of data buffers 522.1-522.14, which may be implemented as data First-In-First-Out buffers and referred to as D-FIFO 522.1-522.14. Each of the D-FIFO 522.1-522.14 may provide a respective output buffer for each of the data outputs 506.1, 506.2, 508.1, 508.2, 510.1, 510.2 and 526.1-526.8. D-FIFO 522.7-522.14 may be mapped to the vector registers IA IB, IC, ID, IE, IF, IG, and IH, respectively.

Inside the SB 500, the data input 502.1 may be coupled to the data outputs 506.1, 506.2, 508.1, 510.1 and 526.1 through 526.8. The data input 502.2 may be coupled to the data outputs 506.1, 506.2, 508.1, 508.2, 510.2 and 526.1 through 526.8. The data input 514.1 may be coupled to the data outputs 504.1-504.3, 506.1, 506.2, 508.1, 510.1, and 526.1 through 526.8. The data input 514.2 may be coupled to the data outputs 504.2, 504.3, 506.1, 506.2, 508.1, 508.2, 510.2 and 526.1 through 526.8. Each of the data inputs 524.1, 524.3, 524.5, and 524.7 may be coupled to the data outputs 504.1-504.3, 506.1, 506.2, 508.1, 510.1, and a corresponding one of outputs 526.1, 526.3, 526.5, and 526.7. Each of the data inputs 524.2, 524.4, 524.6, and 524.8 may be coupled to the data outputs 504.1-504.3, 506.1, 506.2, 508.1, 508.2, 510.2 and a corresponding one of outputs 526.2, 526.4, 526.6, and 526.8. For example, data input 524.1 may be coupled to 504.1-504.3, 506.1, 506.2, 508.1, 510.1, and 526.1, data input 524.2 may be coupled to 504.1-504.3, 506.1, 506.2, 508.1, 508.2, 510.2 and 526.2, etc. It should be noted that inside the SB 500, the coupling between an input and an output may be switched on (e.g., connected) or off (e.g., disconnected) based on a current configuration being applied at the SB 500. Moreover, D, E, and F ports of a PE may be for 2×M-bit configuration. Only higher M bits of register pairs (e.g., VB, IB, ID, IF, IH, and MB) may be assigned to D and F, and only lower M bits of register pairs (e.g., VA, IA, IC, IE, IG, and MA) may be assigned to E.

Each of the counters 520.1-520.27 at the data ports may be independently responsible for counting data passing through the data port. When one or more configurations may be loaded into the C-FIFO 518, each configuration may specify the number of executions (e.g., NUM_EXEC). These counters may be referred to as warp counters. During execution of one configuration, all counters 520.1-520.27 may independently count the numbers of data passing through the data ports. When all the warp counters reach the number of executions specified in the configuration, the next configuration in the C-FIFO 518 may be applied.

A similar approach of using the warp counters may be applied inside a PE 118, and a memory port 120. Because these counters may facilitate configuration and reconfiguration of each component that may have such counters, these counters may be referred to as reconfiguration counters and a component that has such counters may be referred to as a reconfigurable unit. An embodiment of a processor 100 may provide massive parallel data processing using the various reconfigurable units and may be referred to as a reconfigurable parallel processor (RPP).

Figure 6:
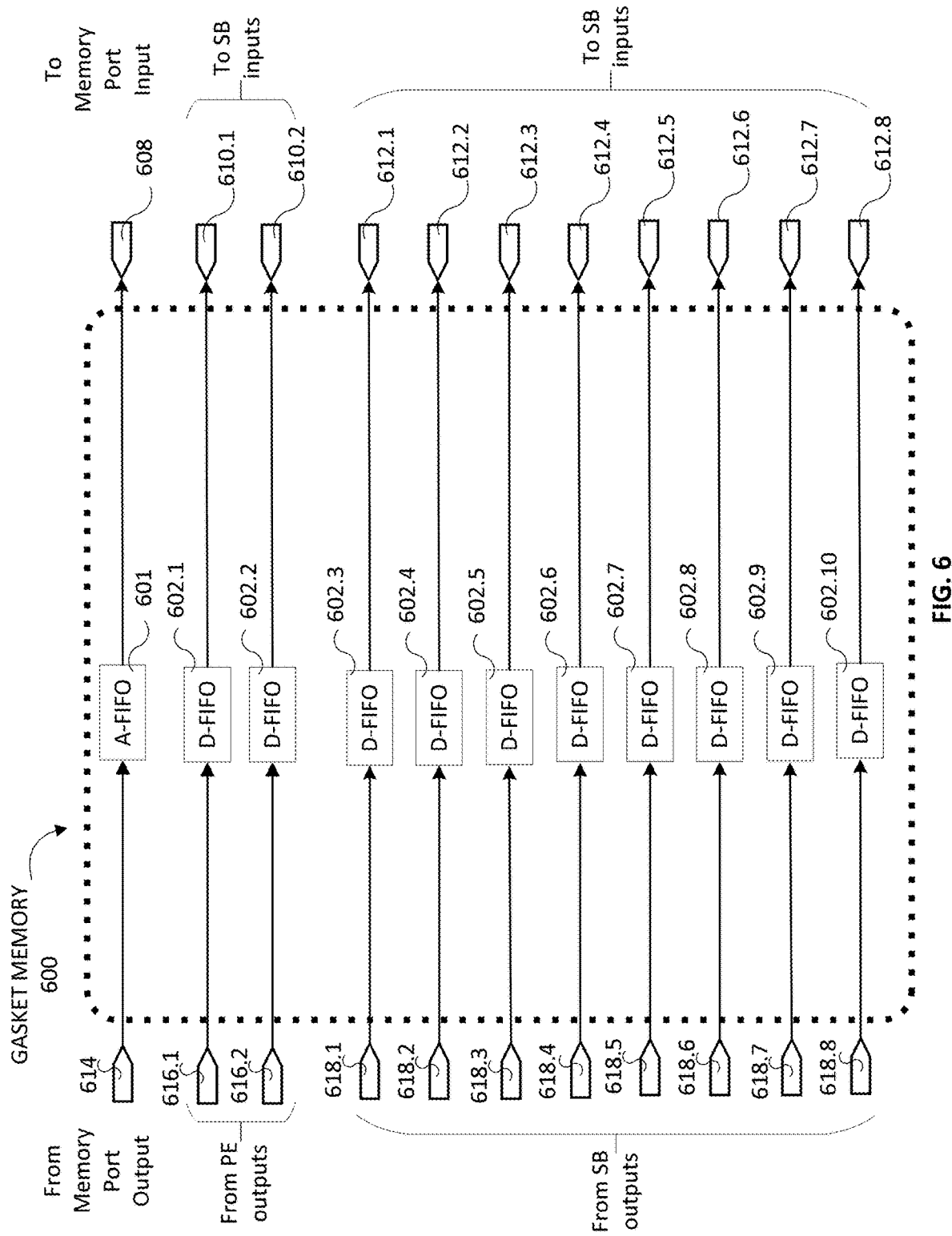
FIG. 6 schematically shows a gasket memory for a processor in accordance with an embodiment of the present disclosure.

FIG. 6 schematically shows a gasket memory 600 in accordance with an embodiment of the present disclosure. The gasket memory 600 may be an embodiment of the gasket memory 116 shown in FIG. 1. The gasket memory 600 may comprise a plurality of buffers for temporary storage of data and one buffer for address. The data buffers may be implemented as First-In-First-Out (FIFO) buffers and referred to as D-FIFOs (e.g., D-FIFO 602.1-602.10). The address buffer may be implemented as an address FIFO (e.g., A-FIFO 601). In addition, the gasket memory 600 may comprise a plurality of data inputs (e.g., 614, 616.1-616.2, and 618.1-618.8), and a plurality of data outputs (e.g., 608, 610.1-610.2, and 612.1-612.8).

The input 614 may be coupled to an output of MP 120.N and the output 608 may be coupled to an input of MP 120.1. Inside the gasket memory 600, the A-FIFO 601 may be coupled between the input 614 and output 608. The inputs 616.1 and 616.2 may be coupled to outputs 208.1 and 208.2 of PE 118.N, respectively. The outputs 610.1 and 610.2 may be coupled to inputs 514.1 and 514.2 of SB 122.1. Inside the gasket memory 600, the D-FIFO 602.1 may be coupled between the input 616.1 and output 610.1, and the D-FIFO 602.2 may be coupled between the input 616.2 and output 610.2. The inputs 618.1-618.8 may be coupled to outputs 526.1-526.8 of SB 122.N, respectively. The outputs 612.1-612.8 may be coupled to inputs 524.1-524.8 of SB 122.1, respectively. Inside the gasket memory 600, the D-FIFOs 602.3-602.10 may be coupled between the inputs 618.1-618.8 and outputs 612.1-612.8, respectively.

Figure 7:
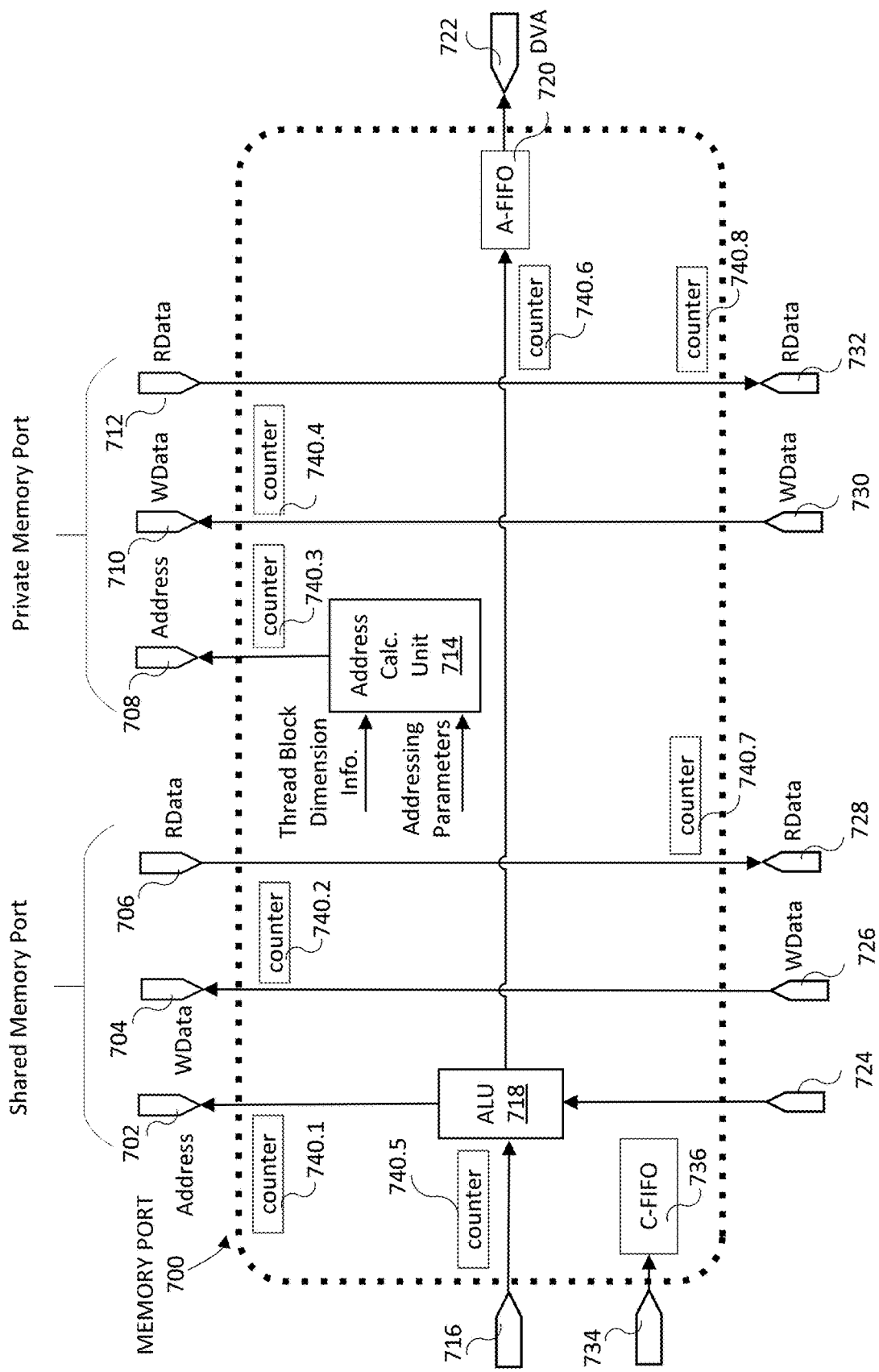
FIG. 7 schematically shows a memory port for a processor in accordance with an embodiment of the present disclosure.

FIG. 7 schematically shows a memory port (MP) 700 for a processor in accordance with an embodiment of the present disclosure. The MP 700 may be an embodiment of a MP 120. The memory port 700 may comprise an address port 702, a WData port 704 and a RData port 706 to be coupled to the address port 428, WData port 430 and RData port 432 of a shared memory access interface 402, respectively; an address port 708, a WData port 710 and a RData port 712 to be coupled to the address port 404, WData port 406 and RData port 408 of a private memory access interface 403, respectively; a data port 724, a WData port 726, a RData port 728, another WData port 730 and another RData port 732 to be coupled to the data ports 504.1, 504.2, 504.3, 502.1 and 502.2 of a SB 500, respectively.

The memory port 700 may further comprise a configuration input 734 and a configuration buffer (e.g., C-FIFO) 736. MP configurations may include instructions to be performed at a MP, for example, LOAD and STORE instructions to load data from the memory unit and to store data to the memory unit. The memory port 700 may further comprise an address input port 716, an ALU 718, an address buffer (e.g., A-FIFO) 720, and an address output port 722. The address input port 716 may be coupled to the address output port 722 of a MP of a preceding column (or the address output port 608 of the gasket memory 600 in case of MP 120.1), and the address output port 722 may be coupled to the address input port 716 of a MP of a succeeding column (or the address input port 614 of the gasket memory 600 in case of MP 120.N). The ALU 718 may perform operations on the addresses received from the address port 716 and the data received from the data port 724, and output the result addresses to the address port 702. Also, the ALU 718 may output the result addresses to the address port 722 or pass the addresses received from the address port 716 to the address port 722. The A-FIFO 720 may temporarily store the addresses from the ALU 718 before the addresses being output from the address port 722. The A-FIFO 720 may be mapped to the vector register DVA.

The memory port 700 may also comprise an address calculation unit 714. The address calculation unit 714 may be configured to generate memory addresses for private memory access using thread block dimension information and addressing parameters such as a base address and gaps of memory address in y axis and z axis. The base address may be a starting memory address for data of a thread block. The thread block dimension information and addressing parameters may be delivered to the MP 700 in a MP configuration.

The memory port 700 may further comprise a plurality of counters 740.1-740.8 for counting the number of executions of one configuration (e.g., NUM_EXEC). Each of the counters 740.1-740.8 may be associated with a data port or address port. Each of the counters 740.1-740.8 may be independently responsible for counting data passed the associated port. For example, the counter 740.1 may be associated with the address port 702, the counter 740.2 may be associated with the WData port 704, the counter 740.3 may be associated with the address port 708, the counter 740.4 may be associated with the WData port 710, the counter 740.5 may be associated with the address input port 716, the counter 740.6 may be associated with the address output port 722, the counter 740.7 may be associated with the RData port 728, and the counter 740.8 may be associated with the RData port 732. The counters 740.1-740.8 may be warp counters. During execution of one configuration, all counters 740.1-740.8 may independently count the numbers of data passing through the data ports. When all the warp counters reach the number of executions specified in the configuration, the next configuration in the C-FIFO 736 may be applied.

In some embodiments, the private memory mode may allow sequential memory access using a scalar memory address. Because the memory addresses for K words of data (e.g., for K concurrent threads of a warp) may be continuous, the address bus in the private memory access mode may only need to provide the memory address of the first element of K words of data. For example, in both memory example one and memory example two, only the memory address for the first piece of data may be provided by a MP (e.g., 15 in memory example one and 122 in memory example two), the memory interface 400 and the memory unit 300 may determine the rest memory addresses for all 32 threads and load (or store) the data for all 32 threads (e.g., 512 bits of data). In these embodiments, because only a scalar memory address is provided from a MP to the memory interface 400, the bit width of the address bus may only need to be G, instead of K×G as in the shared memory access mode. If the memory unit 112 is a byte addressable memory unit, a MP may receive the data size DS as an immediate value in the configuration and send it to a corresponding memory interface via data size bit(s) of a scalar memory address bus.

An example of assembly code for loading data from the memory unit 112 in private memory mode may be: LOAD % BASE, % STRIDE_Y, % STRIDE_Z, DEST, if the memory unit 112 is a word addressable memory unit, and LOAD DS, % BASE, % STRIDE_Y, % STRIDE_Z, DEST if the memory unit 112 is a byte addressable memory unit. This LOAD instruction may be executed by a MP to load K words of data for a warp to the DEST vector register. The execution may be repeated NUM_EXEC times to cover an entire thread block (e.g., NUM_EXEC of warps). The DEST vector register may be a virtual vector register MB mapped to a read data connection from output port 732 of the MP to input port 502.2 of the SB of the same column, or one of vector registers IA through IH mapped to output data buffers of the SB of the same column as the MP. The register MB may send data to the PE of the same column as the MP. The registers IA through IH may send data to the SB of the succeeding column. DS may be an immediate value which may represent the size of data in bytes.

As used herein, the % symbol in front of a parameter name may refer to a scalar register designated to store that parameter value. BASE, STRIDE_Y and STRIDE_Z in the LOAD instruction may be provided by scalar registers in the sequencer 106. BASE, STRIDE_Y, STRIDE_Z, and DS may be referred to as addressing parameters and embedded in the configuration as immediate values delivered from the sequencer 106 to the MP. BASE may be a starting memory address of data to be processed. STRIDE_Y and STRIDE_Z may be gaps of memory address in y axis and z axis, respectively, when the memory unit 112 is a word addressable memory unit or gaps of memory address divided by DS in y axis and z axis, respectively, when the memory unit 112 is a byte addressable memory unit. STRIDE_Y and STRIDE_Z may be given by blockDim.x*gridDim.x and (blockDim.x*gridDim.x)*(blockDim.y*gridDim.y), respectively, with "*" being the multiplication operator.

An example of assembly code for storing data to the memory unit 112 in private memory mode may be: STORE SRC, % BASE, % STRIDE_Y, % STRIDE_Z, when the memory unit 112 is a word addressable memory unit, and STORE DS, SRC, % BASE, % STRIDE_Y, % STRIDE_Z when the memory unit 112 is a byte addressable memory unit. This STORE instruction may be executed by a MP to store K words of data for a warp from the vector register SRC. The execution may be repeated NUM_EXEC times to cover an entire thread block (e.g., NUM_EXEC of warps). The SRC vector register may be one of vector registers VA, VB, and IA through IH mapped to output data buffers of the PE and the SB of the preceding column. The SRC vector register may send data to the output port 504.3 of the SB of the same column which may be coupled to input port 730 of the MP of the same column. DS may be an immediate value representing the size of data in bytes. The addressing parameters BASE, STRIDE_Y, STRIDE_Z, and DS may be embedded in the configuration as immediate values in the same way as LOAD instruction. The generated addresses by the STORE and LOAD instructions using the same addressing parameters may be identical.

If the data is 720P (1280×720) video, the total number of pixels per frame may be 921,600. One pixel may contain 3 colors (e.g., red, green and blue for RGB format, or luma and chromas for YUV format) which may be separately stored in a consecutive address area in the byte addressable memory unit. The size of each color of pixel is one byte and DS is 1. For example, a kernel program may be defined to convert color format from RGB to YUV. One frame of a video stream may be divided into multiple of rectangular windows and a thread block may be mapped to each window. BASE may be a memory address for the upper left corner of a rectangular window. For example, a frame may be divided into 120 of 160×48 windows. Threads may be organized such that dimensions of a grid and a block may be 8×15×1 and 160×48×3, respectively. BASE may be given by base_frame+blockIdx.x*160+blockIdx.y*1280*48. Here, base_frame may be the base address of the frame. STRIDE_Y and STRIDE_Z may be 1280 and 1280*720, respectively.

In one embodiment, the memory address ADDR for the first piece of data for K concurrent threads of a warp may be generated by using addressing parameters in the following formulas: ADDR=BASE+threadIdx.x+threadIdx.y* STRIDE_Y+threadIdx.z*STRIDE_Z when the memory unit 112 is a word addressable memory unit, and ADDR=BASE+(threadIdx.x+threadIdx.y*STRIDE_Y+threadIdx.z*STRIDE_Z)*DS when the memory unit 112 is a byte addressable memory unit. This calculation may be performed by the address calculation unit 714. The memory address may be generated in a single column (e.g., a MP in one column) without using vector registers, which may need to be updated using preceding columns. ThreadIdx.x is the thread index in x axis in the thread block and a multiple of K, threadIdx.y is the thread index in y axis in the thread block, and threadIdx.z is the thread index in z axis in the thread block. The MP may receive the thread block dimension information (e.g., X, Y, and XYZ) embedded in the configuration from the sequencer 106 and calculate threadId.x, threadIdx.y and threadIdx.z by pseudo code as follows, where K is assumed to be 32.

```
threadId.x = threadIdx.y = threadIdx.z =0;
for (int i = 0; i < NUM_EXEC; ++i) {
    calculate ADDR;
    emit ADDR;
    threadId.x += 32;
    if (threadId.x >= X) {
        threadId.x = 0;
        threadIdx.y++;
```

```
        if (threadId.y == Y) {
            threadId.y = 0;
            threadIdx.z++;
        }
    }
}
```

Here, NUM_EXEC may be given by ceil (XYZ/32), with ceil(x) being the ceiling function returning the least integer greater than or equal to x. In one embodiment, the counter 740.3 in a MP may count the number of memory addresses emitted and serve as a loop counter of the for-loop. As shown in the pseudo code above, the memory address ADDR may be emitted for every warp of 32 threads. That is, MP may generate one memory address for thread 0 (to load data for thread 0 through 31), then generate another memory address for thread 32 (to load data for thread 32 through 63), etc. It should be noted that the granularity of the vector operation may be a warp of 32 threads. If there are 100 threads, a vector operation is repeated 4 times (e.g., ceil (100/32)) and the last execution of the vector operation may generate 28 words of invalid data at the end. For example, assuming the memory unit 300 is a byte addressable memory as in the memory example two with the data size (DS) being 2, MP may emit 4 memory addresses 122, 186, 250, 314 to the private memory address port. The 512 bits of data loaded using the address 314 may contain 28 words of invalid data for threads 100 to 127 of the last warp for which PE may generate invalid data. Loading extra data may not harm the performance, but storing invalid data may harm the performance. In one embodiment, a mask may be used by the private memory address port to avoid storing and/or loading invalid data to/from the memory.

Figure 8:
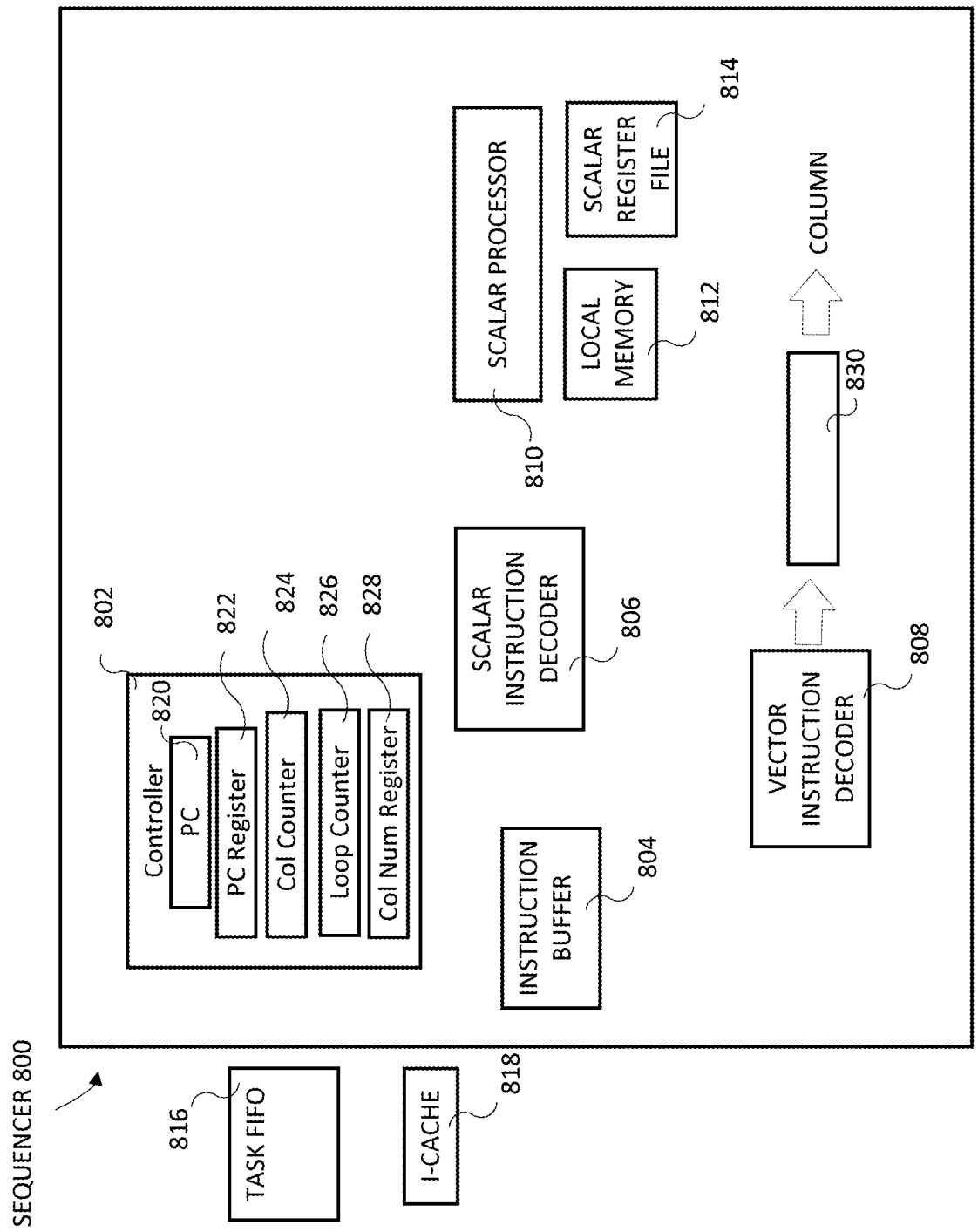
FIG. 8 schematically shows a sequencer for a processor in accordance with an embodiment of the present disclosure.

FIG. 8 schematically shows a sequencer 800 for a processor in accordance with an embodiment of the present disclosure. The sequencer 800 may be an embodiment of the sequencer 106 of FIG. 1, and may decode kernel programs, execute decoded scalar instructions, package decoded vector instructions into configurations and deliver the configurations to columns.

The sequencer 800 may be coupled to a task buffer (e.g., task FIFO) 816 and an instruction cache (e.g., i-Cache) 818. Information of a kernel such as base address of the program, job identifier (e.g., job ID), block identifier (e.g., block ID), and block indices may be transferred to the sequencer 800 via the task buffer 816. In one embodiment, the task buffer 816 and the instruction cache 818 may be part of the configuration memory 104 of FIG. 1. During operation, kernel information may be written to the task buffer 816 by external devices. When the task buffer 816 is not empty, the sequencer 800 may start processing a kernel after reading kernel information from the task buffer 816, then retrieve instructions from the instruction cache 818 for decoding, and stop when an end-of-program instruction is decoded. The sequencer 800 may be idle when the task buffer 816 is empty.

In some embodiments, the kernel information may include a bit to indicate whether the sequencer 802 should work in a continuous mode. If the bit is set, the sequencer 800 may continuously read kernel information from the task buffer 816 and fetch kernel programs. Otherwise, the sequencer 800 may monitor status of columns (e.g., of PE array 114) and wait until all columns become inactive before reading the next kernel information from the task buffer 816.

The sequencer 800 may comprise a controller 802, an instruction buffer 804, a scalar instruction decoder 806, a vector instruction decoder 808, a scalar processor 810, a local memory 812, and a scalar register file 814. The controller 802 may fetch instructions from the instruction cache 818 and put the fetched instructions in the instruction buffer 804. In one embodiment, the instruction buffer 804 may be a circular buffer to hold a number of instructions (e.g., 64 or another number). During operation, for example, the controller 802 may fetch 64 instructions at the beginning of a kernel to fill the instruction buffer 804.

The fetched instructions may include scalar instructions and vector instructions mixed together. Certain bits of an instruction (e.g., the most significant 4 bits, the least significant four bits, or other bits) may specify a hardware unit designated to execute the instruction. The controller 802 may examine these bits and determine whether an instruction is a scalar instruction or a vector instruction based on the designated hardware unit.

The instruction buffer 804 may have an instruction pointer pointing to an instruction in the instruction buffer 804 as the next instruction to be processed. The next instruction to be processed may also be pointed to by a Program Counter (PC) 820 in the controller 802. The controller 802 may determine whether an instruction is a scalar instruction or a vector instruction, and direct scalar instructions to be sent to the scalar instruction decoder 806 and vector instructions to be sent to the vector instruction decoder 808. In some embodiments, the scalar instruction decoder 806 may decode one scalar instruction in one cycle and the vector instruction decoder 808 may decode a plurality of vector instructions in one cycle. For example, in one embodiment, the vector instruction decoder 808 may decode up to 8 vector instructions in one cycle. However, if a vector instruction refers one or more registers in the scalar register file 814 and the one or more registers are not ready yet, wait cycles may be inserted. The PC 820 may be incremented by one when the scalar instruction decoder 806 decodes a scalar instruction. When the vector instruction decoder 808 decodes vector instructions, the PC 820 may be incremented by the number of decoded vector instructions.

The sequencer 800 may sequentially process instructions in the order stored in the instruction cache 818. Scalar instructions decoded by the scalar instruction decoder 806 may be executed on the fly by controller 802 and the scalar processor 810. Scalar instructions may generate parameters used to configure columns and manage loops and branches.

The vector instruction decoder 808 may decode vector instructions to generate configurations for vector processing units. Vector instructions may configure data paths in columns, control data flow and process data in parallel threads. For example, vector instructions for the memory ports (e.g., MPs 120) may include memory access instructions, such as but not limited to, LOAD and STORE; vector instructions for the switch boxes (e.g., SBs 122) may include data copy instructions, such as but not limited to, MOVE and FORWARD; and vector instructions for the processing elements (e.g., PEs 118) may include arithmetic and logical instructions, such as but not limited to, ADD and SUBTRACT, etc.

FIG. 8 shows a configuration 830 as an example of a configuration generated by the vector instruction decoder 808 and delivered to the columns. The configuration 830 may include a field for hardware configuration and a field for a set of immediate values. The field for hardware configuration may include one or more instructions to be performed at a vector processing unit. The set of immediate values may include parameters for the instructions.

In some embodiments, configurations may be broadcasted to all columns. One of the columns may be a destination or target column for one set of configurations, each column may have a separate single line coupled to the sequencer for transmitting a valid bit. The scalar instruction decoder 806 may assert the valid bit to select a target column when the configuration buffer of the target column is not full. That is, when the configuration buffer of the target column (e.g., configuration buffers of MP, PE, SB of the selected column) has available space, the valid bit for the target column may be asserted for the configurations to be received by the target column. When valid signals are not asserted, inputs of configuration buffers of the vector processing units may be tied to the ground to prevent logics in the vector processing units from toggling.

The configuration buffer size for the vector processing units may be larger than one configuration unit size so that there is no need for the sequencer 800 and columns to be synchronized. That is, each of the vector processing units may hold more than one configuration at any time and each column of vector processing units may execute decoded vector instructions in an asynchronous manner with respect to the sequencer 800. Therefore, the sequencer 800 may complete configuration dispatch before columns complete program execution. In at least one embodiment, the sequencer 800 may monitor whether columns are active or inactive but does not monitor which instructions columns are executing.

The destination column may be sequentially selected one at a time in the order of column number. Because the columns may be chained in a loop (e.g., MPs chained from MP 120.1 through 120.N then back to MP 120.1 via the gasket memory 116, SBs and PEs chained from SB 122.1 to PE 118.1 through SB 122.N to PE 118.N then back to SB 122.1 via the gasket memory 116), execution of a kernel program may select any column as a starting column. In one embodiment, the first column of the PE array 114 (e.g., the MP 120.1, SB 122.1, and PE 118.1) may be selected to start execution of a kernel program and other columns may be sequentially selected one at a time in the order of column number.

Kernel specific parameters may be set in the local memory 812 by external devices before the kernel is initiated. The local memory 812 may be Random Access Memory (RAM) (e.g., DRAM, SRAM, etc.). While executing some scalar instructions, the scalar processor 810 may read these parameters from local memory 812, process the parameters, and store the parameters to scalar registers of the scalar register file 814. For example, the scalar processor 810 may execute a CONFIGXYZ instruction such as CONFIGXYZ % X, % Y, % XYZ, in which % X, % Y, % XYZ may be three separate scalar registers of the scalar register file 814 designated to store the dimension information for the thread block of the kernel program being processed. The X, Y, XYZ values may be stored in the local memory 812 before launching the kernel.

The scalar register file 814 may be shared by the scalar processor 810 and vector instruction decoder 808. The vector instruction decoder 808 may obtain the kernel specific parameters from the scalar register file 814 and deliver them to columns as immediate values in configurations. For example, the dimension X, Y, XYZ information may be delivered to columns as immediate values in configurations. In addition, parameters (e.g., used to configure columns) generated by the scalar processor 810 executing scalar instructions may also be passed over to the vector instruction decoder 808 using the scalar register file 814. In some embodiments, the scalar register file 814 may comprise a plurality of scalar registers. For example, in one embodiment, the scalar register file 814 may comprise 32 16-bit scalar registers denoted as R0 to R31.

The scalar processor 810 may comprise a scalar ALU and a Load/Store Unit. In one embodiment, the ALU may include an integer unit, a floating-point unit, a move unit, and a compare unit. Each of these units may be implemented in a multi-stage pipeline. The Load/Store Unit may also be implemented as multi-stage pipelines. The Load Unit may read data from the local memory 812 and store them to the scalar registers of the scalar register file 814. The Store Unit may write contents of the scalar registers of the scalar register file 814 to the local memory 812.

The scalar instructions decoded by the scalar instruction decoder 806 may include control flow instructions that may be executed by the controller 802. In some embodiments, the control flow instructions may include, but not limited to, repeat, jump, poll, and barrier instructions. A jump instruction is to change the execution flow from the next instruction in a current sequence of instructions to a destination instruction pointed by the jump instruction. A poll instruction is to let the controller 802 stop fetching instructions and wait until the DMA operation is done (e.g., DMA module 102 finishes). The poll instruction may synchronize the sequencer 800 and columns. When a barrier instruction is executed, the controller 802 may stop fetching instructions and wait until all columns become inactive. The barrier instruction may synchronize the sequencer 800 and columns.

In some embodiments, the controller 802 may comprise separate hardware units each configured to execute a different type of instruction assigned to the controller 802. For example, the controller 802 may comprise a hardware unit for executing the jump instructions, another hardware unit for executing the poll instructions and yet another hardware unit for executing the barrier instructions.

For repeat instructions, the controller 802 may be equipped with a PC register 822, a column counter 824, a loop counter 826, and a column number register 828. In one embodiment, these hardware units may be contained in one hardware unit designated for repeat instructions. When a repeat instruction is executed, the controller 802 may capture the current value of the PC 820 in the PC register 822, clear the column counter 824, set the loop counter 826 to the total number of times the instruction to be repeatedly executed, and set the column number register 828 to a number of columns to be repeated. The latter 2 values may be provided by the repeat instruction. The controller 802 may increment the column counter 824 when configurations are sent to a column. If the column counter value in the column counter 824 is equal to the column number register value in the column number register 828, the controller 802 may clear the column counter 824 and decrement the loop counter 826. If the loop counter value in the loop counter 826 is not zero, the controller 802 may replace the value in the PC 820 with the PC register value in the PC register 822 to jump back to the start point of the loop. If the loop counter value is zero, the controller 802 may exit the loop.

Figure 9:
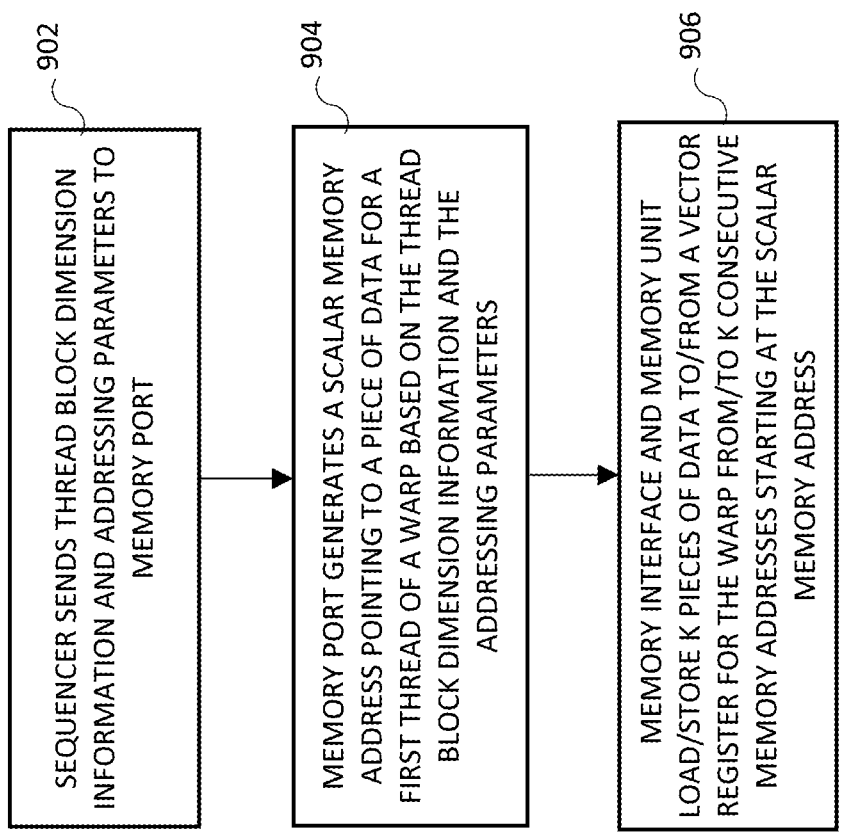
FIG. 9 is a flowchart of a method for loading or storing data for a multi-threaded kernel in accordance with an embodiment of the present disclosure.

FIG. 9 is a flowchart of a process 900 for a processor to load or store vector data using a scalar memory address in accordance with an embodiment of the present disclosure. At block 902, thread block dimension information and addressing parameters (e.g., BASE, STRIDE_Y, STRIDE_Z, and DS) may be sent from a sequencer to a memory port. For example, external devices may set base addresses of data, and dimension information of thread block and grid in the local memory 812 of the sequencer 800, then initiate a kernel program by setting thread block index information in the task buffer 816. The sequencer 800 may be configured to load the thread block index information from the task buffer 816, then execute scalar instructions in the kernel program. The scalar instructions may let the sequencer 800 load base addresses of data, and dimension information of thread block and grid from the local memory 812; calculate addressing parameters using the base addresses of data, and the dimension information of thread block and grid loaded from the local memory 812; and store the thread block dimension information and addressing parameters to scalar registers. The addressing parameters, which may be captured from the scalar registers when a LOAD instruction for a data loading process (or a STORE instruction for a data storing process) is decoded, may be embedded into a configuration for a memory port along with the thread block dimension information and delivered to the memory port.

At block 904, the memory port may generate a scalar memory address (e.g., by the address calculation unit 714) based on the thread block dimension information and the addressing parameters. The scalar memory address may point to storage location of a piece of data for a first thread of a warp.

At block 906, a memory interface and a memory unit may load K words of data for the warp to a vector register from K consecutive memory addresses starting at the scalar memory address for a data loading process, or store K words of data for the warp from a vector register to K consecutive memory addresses starting at the scalar memory address for a data storing process. K may be a warp size representing a number of threads to be concurrently processed by executing a vector instruction. For example, each vector processing unit of the processor 100 may have a vector size K. That is, each vector processing unit of the processor 100 may be configured to execute K concurrent threads in a warp (e.g., K ALUs in a PE). Using the scalar memory address as a starting address, K words of data for K threads may be loaded to a vector register from K consecutive memory addresses for a data loading process, or K words of data for K threads may be stored from a vector register to K consecutive memory addresses for a data storing process.

The present disclosure provides apparatus, systems and methods for reconfigurable parallel processor (RPP). For example, an embodiment of a RPP may utilize a processing element (PE) array as a physical data path to process massive parallel data. The physical data path may be made identical in each section (e.g., one column of a MP, a SB and a PE), which may allow the dependency graph of a kernel program to be mapped to a virtual data path that may be an infinite repetition of the physical data path. Moreover, the scalar instructions of the kernel program may be executed by the sequencer without generating any configurations for a vector processing unit to execute the scalar instructions. Furthermore, scalar control flow instructions may also be executed by the sequencer instead of wasting any vector processing unit cycles.

An embodiment of a RPP may also utilize a gasket memory to temporally store outputs of the physical data path (e.g., processing element (PE) array) which is configured by one segment of the virtual data path which consists of N vector execution nodes. The gasket memory may function as a data buffer (e.g., FIFO) which feeds data back into the physical data path when the physical data path is reconfigured by the next segment of the virtual data path.

An embodiment of a RPP may also have a memory unit with memory interfaces (MIs) connected to each column (e.g., a MP, a SB and a PE) of the physical data path. All data accessed throughout the virtual data path may be stored in the memory unit. For each segment of the virtual data path, a MP may be reconfigured to access the memory unit differently while the data could stay the same.

Embodiments of a RPP may be optimized to allow massive parallelism for Single Instruction Multiple Threads (SIMT) processing. In one example, with one row of 32 PEs and each PE having 32 Arithmetic Logic Units (ALUs), 1024 ALUs may be included in one RPP core. In some embodiments, a multi-core processor may comprise multiple RPPs.

Embodiments of a RPP may be reconfigured according to a reconfiguration mechanism. The various components of a RPP that include one or more reconfiguration counters may be referred to as reconfigurable units. For example, each of the PEs (e.g., PE 118), the switch boxes (e.g., SB 122) and the memory ports (e.g., MP 120), may comprise one or more reconfiguration counters, such as the counter 206 in a PE, the counters 520 in a SB, the counters 740 in a MP. Data processing may be pipelined when there may be no dependency between threads. Identical instructions may be executed multiple times until all threads (e.g., 32 warps of threads for one reconfigurable unit if the total number of threads is 1024) are processed. In various embodiments, when counters in a reconfigurable unit reach a programmed number (e.g., NUM_EXEC), the reconfigurable unit may replace its configuration to a new context. This reconfiguration may be done in the same way in each PE, SB and MP. Self-reconfiguration may be achieved with minimum idle time for switching.

The exemplary reconfiguration mechanism may reduce the power spent on configuration because the configuration is only switched once after all threads have been processed. This may also reduce idle time between configurations by switching each reconfigurable unit independently at its earliest time.

In some embodiments, all warps may load the same data using the same addresses in the shared memory access mode. Due to the pipelined nature of operation, only the data load instruction for the first warp may need to be performed. The data loaded may be shared with other warps to reduce the memory access traffic and power consumption.

Embodiments may provide private memory mode to access sequential memory space in the memory unit for a vector data using a scalar memory address. Because only a scalar memory address is needed to access the vector data, the private memory address bus may only need a bit width of a scalar memory address (instead of a vector address bus) and may be referred to as a scalar memory address bus. Moreover, there is no memory contention for the private memory access mode, thus the memory interface may be simplified. Furthermore, ALUs in MP are not needed for the private memory access mode, and thus the MP may also be simplified (e.g., the ALU 718 may only be implemented for address calculation for shared memory access in the MP 700). In addition, the processor 100 may have improved column usage because there is no need to use MP and/or PE in a preceding column to update vector registers for address calculation.

In an exemplary embodiment, a method may comprise: sending thread block dimension information and addressing parameters stored in scalar registers of a sequencer by the sequencer to a memory port, generating a scalar memory address by the memory port and based on the thread block dimension information and the addressing parameters, and loading K words of data for a warp to a vector register from K consecutive memory addresses starting at the scalar memory address by a memory interface and a memory unit. The scalar memory address may point to a storage location of a piece of data for a first thread of the warp. K may be a warp size representing a number of threads to be concurrently processed by executing a vector instruction. The piece of data may have a size less than or equal to a word size.

In one embodiment, the method may further comprise loading thread block index information from a task buffer of the sequencer and executing scalar instructions in a kernel program at the sequencer to: load base addresses of data, and dimension information of thread block and grid from a local memory of the sequencer; calculate the addressing parameters using the base addresses of data, and the dimension information of thread block and grid loaded from the local memory; and store the thread block dimension information and the addressing parameters to scalar registers of the sequencer.

In one embodiment, the thread block dimension information may include a first value X of thread dimension in x axis, a second value Y of thread dimension in y axis, and a multiplication result XYZ of X multiplied by Y and Z, with Z being thread dimension in z axis and the addressing parameters may include BASE, STRIDE_Y, and STRIDE_Z when the memory unit is a word addressable memory unit, or BASE, STRIDE_Y, STRIDE_Z and DS when the memory unit is a byte addressable memory unit. BASE may be a starting memory address for data to be processed by the kernel program, STRIDE_Y and STRIDE_Z may be gaps of memory address in y axis and z axis, respectively, for the word addressable memory unit, or gaps of memory address divided by DS in y axis and z axis, respectively, for the byte addressable memory unit, and DS may be a data size for the memory unit in bytes.

In one embodiment, the memory unit may include a plurality of memory banks, the scalar memory address may comprise bank selection bit(s) functioning as a memory bank index pointing to a memory bank of the plurality of memory banks, and the memory interface may be configured to generate a plurality of bank addresses, with one bank address per memory bank, using the scalar memory address starting at the memory bank selected by the bank selection bit(s) and rearrange the K words of data received from the plurality of memory banks in an order of corresponding threads.

In one embodiment, the scalar memory address may be calculated by the memory port as ADDR=BASE+threadIdx.x+threadIdx.y*STRIDE_Y+threadIdx.z*STRIDE_Z for the word addressable memory unit, or as ADDR=BASE+(threadIdx.x+threadIdx.y*STRIDE_Y+threadIdx.z*STRIDE_Z)*DS for the byte addressable memory unit, threadIdx.x may be a thread index in x axis in a thread block of the kernel program and a multiple of K, threadIdx.y may be a thread index in y axis in the thread block, and threadIdx.z may be a thread index in z axis in the thread block.

In one embodiment, the thread block of the kernel program may be mapped to a rectangular window in a set of data for an image and BASE may be a memory address for an upper left corner of the rectangular window.

In one embodiment, the memory port may be coupled to the memory unit via the memory interface by a private memory address port that may comprise a scalar memory address bus. The scalar memory address may be transmitted to the memory interface via the scalar memory address bus. And if the memory unit is a byte addressable memory unit, a data size DS may be transmitted to the memory interface via data size bit(s) of the scalar memory address bus.

In one embodiment, the vector register may be mapped to an output data buffer of a switch box or may be a virtual vector register mapped to a read data connection from the memory port to the switch box.

In another exemplary embodiment, a processor may comprise: a sequencer, a memory port coupled to the sequencer, and a memory unit coupled to the memory port via a memory interface. The sequencer may be configured to send thread block dimension information and addressing parameters stored in scalar registers of the sequencer to the memory port. The memory port may be configured to generate, based on the thread block dimension information and the addressing parameters, a scalar memory address pointing to a storage location of a piece of data for the first thread of a warp. The memory interface and memory unit may be configured to load K words of data for the warp to a vector register from K consecutive memory addresses starting at the scalar memory address for a data loading process or store K words of data for the warp from the vector register to the K consecutive memory addresses starting at the scalar memory address for a data storing process. K may be a warp size representing a number of threads to be concurrently processed by executing a vector instruction. The piece of data may have a size less than or equal to a word size.

In one embodiment, the sequencer may be further configured to load thread block index information from a task buffer of the sequencer and execute scalar instructions in a kernel program to: load base addresses of data, and dimension information of thread block and grid from a local memory of the sequencer; calculate the addressing parameters using the base addresses of data, and the dimension information of thread block and grid loaded from the local memory; and store the thread block dimension information and the addressing parameters to scalar registers of the sequencer.

In one embodiment, the thread block dimension information may include a first value X of thread dimension in x axis, a second value Y of thread dimension in y axis, and a multiplication result XYZ of X multiplied by Y and Z, with Z being thread dimension in z axis and the addressing parameters may include BASE, STRIDE_Y, and STRIDE_Z when the memory unit is a word addressable memory unit, or BASE, STRIDE_Y, STRIDE_Z and DS when the memory unit is a byte addressable memory unit. BASE may be a starting memory address for data to be processed by the kernel program, STRIDE_Y and STRIDE_Z may be gaps of memory address in y axis and z axis, respectively, for the word addressable memory unit, or gaps of memory address divided by DS in y axis and z axis, respectively, for the byte addressable memory unit. DS may be a data size for the memory unit in bytes.

In one embodiment, the memory unit may include a plurality of memory banks, the scalar memory address may comprise bank selection bit(s) functioning as a memory bank index pointing to a memory bank of the plurality of memory banks. The memory interface may be configured to generate a plurality of bank addresses, with one bank address per memory bank, using the scalar memory address starting at the memory bank selected by the bank selection bit(s). For a data loading process, the memory interface may be further configured to rearrange K words of data received from the plurality of memory banks in an order of corresponding threads. And, for a data storing process, the memory interface may be further configured to split K words of data received from the memory port into a plurality of groups, with one group per memory bank, each of which is stored to one of the plurality of memory banks.

In one embodiment, the scalar memory address may be calculated by the memory port as ADDR=BASE+threadIdx.x+threadIdx.y*STRIDE_Y+threadIdx.z*STRIDE_Z for the word addressable memory unit, or as ADDR=BASE+ (threadIdx.x+threadIdx.y*STRIDE_Y+ threadIdx.z*STRIDE_Z)*DS for the byte addressable memory unit. threadIdx.x may be a thread index in x axis in a thread block of the kernel program and a multiple of K, threadIdx.y may be a thread index in y axis in the thread block, and threadIdx.z may be a thread index in z axis in the thread block.

In one embodiment, the thread block of the kernel program may be mapped to a rectangular window in a set of data for an image and BASE may be a memory address for an upper left corner of the rectangular window.

In one embodiment, the memory port may be coupled to the memory unit via the memory interface by a private memory address port that comprises a scalar memory address bus. The scalar memory address may be transmitted to the memory interface via the scalar memory address bus. And, if the memory unit is a byte addressable memory unit, a data size DS may be transmitted to the memory interface via data size bit(s) of the scalar memory address bus.

In one embodiment, the vector register may be mapped to an output data buffer of a switch box or may be a virtual vector register mapped to a read data connection from the memory port to the switch box.

In yet another embodiment, a method may comprise: sending thread block dimension information and addressing parameters stored in scalar registers of a sequencer by the sequencer to a memory port, generating a scalar memory address by the memory port and based on the thread block dimension information and the addressing parameters, and storing K words of data for a warp from a vector register to K consecutive memory addresses starting at the scalar memory address by a memory interface and a memory unit. The scalar memory address may point to a storage location of a piece of data for a first thread of the warp. K may be a warp size representing a number of threads to be concurrently processed by executing a vector instruction. And the piece of data may have a size less than or equal to a word size.

In one embodiment, the method may further comprise loading thread block index information from a task buffer of the sequencer and executing scalar instructions in a kernel program at the sequencer to: load base addresses of data, and dimension information of thread block and grid from a local memory of the sequencer; calculate the addressing parameters using the base addresses of data, and the dimension information of thread block and grid loaded from the local memory; and store the thread block dimension information and the addressing parameters to scalar registers of the sequencer.

In one embodiment, the thread block dimension information may include a first value X of thread dimension in x axis, a second value Y of thread dimension in y axis, and a multiplication result XYZ of X multiplied by Y and Z, with Z being thread dimension in z axis and the addressing parameters may include BASE, STRIDE_Y, and STRIDE_Z when the memory unit is a word addressable memory unit, or BASE, STRIDE_Y, STRIDE_Z and DS when the memory unit is a byte addressable memory unit. BASE may be a starting memory address for data to be processed by the kernel program, STRIDE_Y and STRIDE_Z may be gaps of memory address in y axis and z axis, respectively, for the word addressable memory unit, or gaps of memory address divided by DS in y axis and z axis, respectively, for the byte addressable memory unit. And DS may be a data size for the memory unit in bytes.

In one embodiment, the memory unit may include a plurality of memory banks, the scalar memory address may be calculated by the memory port as ADDR=BASE+threadIdx.x+threadIdx.y*STRIDE_Y+threadIdx.z*STRIDE_Z when the memory unit is a word addressable memory unit, or as ADDR=BASE+ (threadIdx.x+threadIdx.y*STRIDE_Y+threadIdx.z *STRIDE_Z)*DS when the memory unit is a byte addressable memory unit. threadIdx.x may be a thread index in x axis in a thread block of the kernel program and a multiple of K, threadIdx.y may be a thread index in y axis in the thread block, and threadIdx.z may be a thread index in z axis in the thread block.

The techniques described herein may be implemented in one or more application specific integrated circuits (ASICs) in digital logic gates, or by a processor that executes instructions stored in a tangible processor readable memory storage media. In one embodiment, any of the disclosed methods and operations may be implemented in software comprising computer-executable instructions stored on one or more computer-readable storage media. The one or more computer-readable storage media may include non-transitory computer-readable media (such as removable or non-removable magnetic disks, magnetic tapes or cassettes, solid state drives (SSDs), hybrid hard drives, CD-ROMs, CD-RWs, DVDs, or any other tangible storage medium), volatile memory components (such as DRAM or SRAM), or non-volatile memory components (such as hard drives)). The computer-executable instructions may be executed on a processor (e.g., a microcontroller, a microprocessor, a digital signal processor, etc.). Moreover, an embodiment of the present disclosure may be used as a general-purpose processor, a graphics processor, a microcontroller, a microprocessor, or a digital signal processor.

It should be noted that as used herein, a "coupling" and a "connection" between two components, such as one component being "coupled" or "connected" to another component may refer to an electronic connection between two components, which may include but not limited to, by electronic wiring, through an electronic element (e.g., a resistor, a transistor), etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
sending, by a sequencer to a memory port, thread block dimension information and addressing parameters stored in scalar registers of the sequencer;
generating, by the memory port and based on the thread block dimension information and the addressing parameters, a scalar memory address pointing to a storage location of a piece of data for a first thread of a warp; and
loading, by a memory interface and a memory unit, K words of data for the warp to a vector register from K consecutive memory addresses starting at the scalar memory address, K being a warp size representing a number of threads to be concurrently processed by executing a vector instruction, wherein the piece of data has a size less than or equal to a word size.

2. The method of claim 1, further comprising:
loading thread block index information from a task buffer of the sequencer; and
executing scalar instructions in a kernel program at the sequencer to:
  load base addresses of data, and dimension information of thread block and grid from a local memory of the sequencer,
  calculate the addressing parameters using the base addresses of data, and the dimension information of thread block and grid loaded from the local memory, and
  store the thread block dimension information and the addressing parameters to scalar registers of the sequencer.

3. The method of claim 2, wherein the thread block dimension information includes a first value X of thread dimension in x axis, a second value Y of thread dimension in y axis, and a multiplication result XYZ of X multiplied by Y and Z, with Z being thread dimension in z axis and the addressing parameters include BASE, STRIDE_Y, and STRIDE_Z when the memory unit is a word addressable memory unit, or BASE, STRIDE_Y, STRIDE_Z and DS when the memory unit is a byte addressable memory unit, wherein BASE is a starting memory address for data to be processed by the kernel program, STRIDE_Y and STRIDE_Z are gaps of memory address in y axis and z axis, respectively, for the word addressable memory unit, or gaps of memory address divided by DS in y axis and z axis, respectively, for the byte addressable memory unit, and DS is a data size for the memory unit in bytes.

4. The method of claim 3, wherein the memory unit includes a plurality of memory banks, the scalar memory address comprises bank selection bit(s) functioning as a memory bank index pointing to a memory bank of the plurality of memory banks, and wherein the memory interface is configured to generate a plurality of bank addresses, with one bank address per memory bank, using the scalar memory address starting at the memory bank selected by the bank selection bit(s) and rearrange the K words of data received from the plurality of memory banks in an order of corresponding threads.

5. The method of claim 4, wherein the scalar memory address is calculated by the memory port as ADDR=BASE+threadIdx.x+threadIdx.y*STRIDE_Y+threadIdx.z*STRIDE_Z for the word addressable memory unit, or as ADDR=BASE+ (threadIdx.x+threadIdx.y*STRIDE_Y+threadIdx.z*STRIDE_Z)*DS for the byte addressable memory unit, wherein threadIdx.x is a thread index in x axis in a thread block of the kernel program and a multiple of K, threadIdx.y is a thread index in y axis in the thread block, and threadIdx.z is a thread index in z axis in the thread block.

6. The method of claim 5, wherein the thread block of the kernel program is mapped to a rectangular window in a set of data for an image and BASE is a memory address for an upper left corner of the rectangular window.

7. The method of claim 1, wherein the memory port is coupled to the memory unit via the memory interface by a private memory address port that comprises a scalar memory address bus, the scalar memory address is transmitted to the memory interface via the scalar memory address bus, and if the memory unit is a byte addressable memory unit, a data size DS is transmitted to the memory interface via data size bit(s) of the scalar memory address bus.

8. The method of claim 1, wherein the vector register is mapped to an output data buffer of a switch box or is a virtual vector register mapped to a read data connection from the memory port to the switch box.

9. A processor, comprising:
a sequencer;
a memory port coupled to the sequencer, wherein the sequencer is configured to send thread block dimension information and addressing parameters stored in scalar registers of the sequencer to the memory port, and the memory port is configured to generate, based on the thread block dimension information and the addressing parameters, a scalar memory address pointing to a storage location of a piece of data for the first thread of a warp; and
a memory unit coupled to the memory port via a memory interface and configured to load K words of data for the warp to a vector register from K consecutive memory addresses starting at the scalar memory address for a data loading process or store K words of data for the warp from the vector register to the K consecutive memory addresses starting at the scalar memory address for a data storing process, K being a warp size representing a number of threads to be concurrently processed by executing a vector instruction, wherein the piece of data has a size less than or equal to a word size.

10. The processor of claim 9, the sequencer is further configured to load thread block index information from a task buffer of the sequencer and execute scalar instructions in a kernel program to:
load base addresses of data, and dimension information of thread block and grid from a local memory of the sequencer,
calculate the addressing parameters using the base addresses of data, and the dimension information of thread block and grid loaded from the local memory, and
store the thread block dimension information and the addressing parameters to scalar registers of the sequencer.

11. The processor of claim 10, wherein the thread block dimension information includes a first value X of thread dimension in x axis, a second value Y of thread dimension in y axis, and a multiplication result XYZ of X multiplied by Y and Z, with Z being thread dimension in z axis and the addressing parameters include BASE, STRIDE_Y, and STRIDE_Z when the memory unit is a word addressable memory unit, or BASE, STRIDE_Y, STRIDE_Z and DS when the memory unit is a byte addressable memory unit, wherein BASE is a starting memory address for data to be processed by the kernel program, STRIDE_Y and STRIDE_Z are gaps of memory address in y axis and z axis, respectively, for the word addressable memory unit, or gaps of memory address divided by DS in y axis and z axis, respectively, for the byte addressable memory unit, and DS is a data size for the memory unit in bytes.

12. The processor of claim 11, wherein the memory unit includes a plurality of memory banks, the scalar memory address comprises bank selection bit(s) functioning as a memory bank index pointing to a memory bank of the plurality of memory banks, wherein the memory interface is configured to generate a plurality of bank addresses, with one bank address per memory bank, using the scalar memory address starting at the memory bank selected by the bank selection bit(s), and for a data loading process, the memory interface is further configured to rearrange K words of data received from the plurality of memory banks in an order of corresponding threads, and for a data storing process, the memory interface is further configured to split K words of data received from the memory port into a plurality of groups, with one group per memory bank, each of which is stored to one of the plurality of memory banks.

13. The processor of claim 12, wherein the scalar memory address is calculated by the memory port as ADDR=BASE+ threadIdx.x+threadIdx.y*STRIDE_Y+ threadIdx.z*STRIDE_Z for the word addressable memory unit, or as ADDR=BASE+ (threadIdx.x+threadIdx.y* STRIDE_Y+threadIdx.z*STRIDE_Z)*DS for the byte addressable memory unit, wherein threadIdx.x is a thread index in x axis in a thread block of the kernel program and a multiple of K, threadIdx.y is a thread index in y axis in the thread block, and threadIdx.z is a thread index in z axis in the thread block.

14. The processor of claim 13, wherein the thread block of the kernel program is mapped to a rectangular window in a set of data for an image and BASE is a memory address for an upper left corner of the rectangular window.

15. The processor of claim 9, wherein the memory port is coupled to the memory unit via the memory interface by a private memory address port that comprises a scalar memory address bus, the scalar memory address is transmitted to the memory interface via the scalar memory address bus, and, if the memory unit is a byte addressable memory unit, a data size DS is transmitted to the memory interface via data size bit(s) of the scalar memory address bus.

16. The processor of claim 9, wherein the vector register is mapped to an output data buffer of a switch box or is a virtual vector register mapped to a read data connection from the memory port to the switch box.

17. A method, comprising:
sending, by a sequencer to a memory port, thread block dimension information and addressing parameters stored in scalar registers of the sequencer;
generating, by the memory port and based on the thread block dimension information and the addressing parameters, a scalar memory address pointing to a storage location of a piece of data for a first thread of a warp; and
storing, by a memory interface and a memory unit, K words of data for the warp from a vector register to K consecutive memory addresses starting at the scalar memory address, K being a warp size representing a number of threads to be concurrently processed by executing a vector instruction, wherein the piece of data has a size less than or equal to a word size.

18. The method of claim 17, further comprising:
loading thread block index information from a task buffer of the sequencer; and
executing scalar instructions in a kernel program at the sequencer to:
load base addresses of data, and dimension information of thread block and grid from a local memory of the sequencer,
calculate the addressing parameters using the base addresses of data, and the dimension information of thread block and grid loaded from the local memory, and
store the thread block dimension information and the addressing parameters to scalar registers of the sequencer.

19. The method of claim 18, wherein the thread block dimension information includes a first value X of thread dimension in x axis, a second value Y of thread dimension in y axis, and a multiplication result XYZ of X multiplied by Y and Z, with Z being thread dimension in z axis and the addressing parameters include BASE, STRIDE_Y, and STRIDE_Z when the memory unit is a word addressable memory unit, or BASE, STRIDE_Y, STRIDE_Z and DS when the memory unit is a byte addressable memory unit, wherein BASE is a starting memory address for data to be processed by the kernel program, STRIDE_Y and STRIDE_Z are gaps of memory address in y axis and z axis, respectively, for the word addressable memory unit, or gaps of memory address divided by DS in y axis and z axis, respectively, for the byte addressable memory unit, and DS is a data size for the memory unit in bytes.

20. The method of claim 19, wherein the memory unit includes a plurality of memory banks, the scalar memory address is calculated by the memory port as ADDR=BASE+ threadIdx.x+threadIdx.y*STRIDE_Y+ threadIdx.z*STRIDE_Z for the word addressable memory unit, or as ADDR=BASE+ (threadIdx.x+threadIdx.y* STRIDE_Y+threadIdx.z*STRIDE_Z)*DS for the byte addressable memory unit, wherein threadIdx.x is a thread index in x axis in a thread block of the kernel program and a multiple of K, threadIdx.y is a thread index in y axis in the thread block, and threadIdx.z is a thread index in z axis in the thread block.

* * * * *